US012802408B2

(12) United States Patent
Stonehouse

(10) Patent No.: US 12,802,408 B2
(45) Date of Patent: Nov. 17, 2026

(54) METHODS AND SYSTEMS FOR ENABLING ROBUST AND COST-EFFECTIVE MASS DETECTION OF COUNTERFEITED PRODUCTS

(71) Applicant: The Procter & Gamble Company, Cincinnati, OH (US)

(72) Inventor: Jonathan Richard Stonehouse, Windlesham (GB)

(73) Assignee: THE PROCTER & GAMBLE COMPANY, Cincinnati, OH (US)

( * ) Notice: Subject to any disclaimer, the term of this patent is extended or adjusted under 35 U.S.C. 154(b) by 502 days.

(21) Appl. No.: 18/095,150

(22) Filed: Jan. 10, 2023

(65) Prior Publication Data

US 2023/0222775 A1 Jul. 13, 2023

Related U.S. Application Data

(60) Provisional application No. 63/297,821, filed on Jan. 10, 2022.

(51) Int. Cl.

*G06V 10/774* (2022.01)
*G06K 7/14* (2006.01)

(Continued)

(52) U.S. Cl.

CPC ......... *G06V 10/774* (2022.01); *G06K 7/1413* (2013.01); *G06V 10/7715* (2022.01); *G06V 20/95* (2022.01)

(58) Field of Classification Search

CPC .. G06V 10/774; G06V 10/7715; G06V 20/95; G06K 7/1413; G06K 19/06009; G06Q 30/0185; G06Q 50/04

See application file for complete search history.

(56) References Cited

U.S. PATENT DOCUMENTS

| | | | |
|---|---|---|---|
| 8,703,068 | B1 | 4/2014 | Stonehouse et al. |
| 8,755,837 | B2 | 6/2014 | Rhoads et al. |

(Continued)

FOREIGN PATENT DOCUMENTS

| | | | |
|---|---|---|---|
| CN | 104573688 | A | 4/2015 |
| CN | 104778702 | A | 7/2015 |

(Continued)

OTHER PUBLICATIONS

All Office Actions; U.S. Appl. No. 16/953,387, filed Jul. 7, 2021.

(Continued)

*Primary Examiner* — Bernard Krasnic
(74) *Attorney, Agent, or Firm* — Matthew J. Spegele

(57) ABSTRACT

A counterfeit and imaging detection system includes a processor, a counterfeit product detection app, and a steganographic imaging model, electronically accessible by the counterfeit product detection app trained using image data and configured cause the processor to obtain a digital image of a physical product of a product line, the digital image captured by an imaging device and the digital image comprising pixel data, analyze the digital image to detect within the pixel data a batch code uniquely identifying a batch of the physical product of the product line, analyze the pixel data of the digital image to determine that the batch code is counterfeit, and augment a counterfeit list of batch codes to include the batch code, wherein the counterfeit list of batch codes remains electronically accessible to the counterfeit product detection app for one or more further counterfeit detection iterations.

19 Claims, 7 Drawing Sheets

(51) Int. Cl.
*G06V 10/77* (2022.01)
*G06V 20/00* (2022.01)

(56) References Cited

U.S. PATENT DOCUMENTS

| | | | |
|---|---|---|---|
| 8,893,974 B2 | 11/2014 | Pawlik et al. | |
| 9,443,179 B2 | 9/2016 | Meadows et al. | |
| 9,607,199 B2 | 3/2017 | Stein | |
| 9,846,814 B1 | 12/2017 | Fraser | |
| 11,074,592 B2 | 7/2021 | Stonehouse et al. | |
| 2011/0280480 A1 | 11/2011 | Simske et al. | |
| 2014/0037196 A1 | 2/2014 | Blair | |
| 2014/0151454 A1* | 6/2014 | Pawlik | G06K 19/14 235/462.41 |
| 2016/0110630 A1 | 4/2016 | Heusch et al. | |
| 2016/0169818 A1 | 6/2016 | Martin | |
| 2016/0283975 A1 | 9/2016 | Kaul | |
| 2017/0032285 A1 | 2/2017 | Sharma | |
| 2017/0161745 A1* | 6/2017 | Hawkins | G06Q 20/3224 |
| 2017/0193525 A1* | 7/2017 | Shah | G06K 7/1413 |
| 2017/0316477 A1* | 11/2017 | Prasad | G06Q 50/01 |
| 2018/0068429 A1 | 3/2018 | Tan et al. | |
| 2018/0108101 A1* | 4/2018 | Rodriguez | G06K 19/06028 |
| 2018/0247194 A1 | 8/2018 | Plebani et al. | |
| 2019/0126659 A1 | 5/2019 | Dorier | |
| 2019/0138775 A1 | 5/2019 | Graindourze | |
| 2019/0197358 A1 | 6/2019 | Madani et al. | |
| 2019/0213462 A1 | 7/2019 | Mcdonald et al. | |
| 2019/0213604 A1 | 7/2019 | Meadows et al. | |
| 2019/0236614 A1 | 8/2019 | Burgin | |
| 2019/0293564 A1 | 9/2019 | Mehrotra et al. | |
| 2019/0392458 A1* | 12/2019 | Stonehouse | G06K 19/06178 |
| 2020/0005237 A1 | 1/2020 | Simons | |
| 2020/0104588 A1 | 4/2020 | Annunziata et al. | |
| 2020/0265279 A1 | 8/2020 | Geering | |
| 2020/0410510 A1 | 12/2020 | Lau et al. | |
| 2021/0004949 A1 | 1/2021 | Broyda et al. | |
| 2021/0074109 A1 | 3/2021 | Depta | |
| 2021/0086030 A1* | 3/2021 | Kashyap | G06N 20/00 |
| 2021/0192340 A1 | 6/2021 | Stonehouse et al. | |
| 2021/0374476 A1 | 12/2021 | Heikel | |
| 2022/0051040 A1* | 2/2022 | Pegurri | G06V 20/80 |
| 2022/0292856 A1 | 9/2022 | Stonehouse | |

FOREIGN PATENT DOCUMENTS

| | | | | |
|---|---|---|---|---|
| CN | 106469336 A | | 3/2017 | |
| CN | 106530200 A | | 3/2017 | |
| CN | 107563774 A | | 1/2018 | |
| CN | 109190736 A | | 1/2019 | |
| CN | 109766944 A | | 5/2019 | |
| CN | 109934761 A | | 6/2019 | |
| CN | 110222728 A | | 9/2019 | |
| CN | 110766423 A | * | 2/2020 | G06K 19/06037 |
| CN | 112001630 A | * | 11/2020 | G06Q 10/06395 |
| EP | 4033376 A1 | | 7/2022 | |
| GB | 2591178 A | | 7/2021 | |
| JP | 2017041161 A | | 2/2017 | |
| WO | 2010085257 A1 | | 7/2010 | |
| WO | 2012109294 A1 | | 8/2012 | |
| WO | 2013145224 A1 | | 10/2013 | |
| WO | 2015157526 A1 | | 10/2015 | |
| WO | 2016157172 A2 | | 10/2016 | |
| WO | 2018169657 A1 | | 9/2018 | |
| WO | 2021105514 A1 | | 6/2021 | |
| WO | 2021262757 A1 | | 12/2021 | |

OTHER PUBLICATIONS

All Office Actions; U.S. Appl. No. 17/671,647, filed Feb. 15, 2022.

G. Ford, "4 human-caused biases we need to fix formachine learning", Oct. 27, 2018. Available from https :!!thenextweb. comlnews!4-human-caused-biases-machine-learning, [accessed May 7, 2021].See section 3—Measurement bias.

S. Ghoneim, "5 Types of bias and how to eliminate them in your machine learning project", Apr. 16, 2019. Available from https :!!towardsdatascience. coml5 -types-of-bias-how-to-eliminate-themin-your-machine-learning-proj ect-75 959af9d3 aO [accessed May 7, 2021]. See section 5—Measurement bias.

Swooptalent, "Machine learning bias", 2018. Available from https :!!www. swooptalent. comlhubfs!Machine%2oLearning%2OBias%20Overview%20-%2oKevin%2Oat%2oSwoopTalent.pdf?ga=2. 194658286.295599295.155732995 1-129422730.1537454063 [Accessed May 7, 2021].See slide 9.

T. Merritt, "Top 5 ways humans bias machinelearning", Jan. 9, 2019. Available from https :!!www.techrepublic.comlarticle!top-5 -ways-humans-bias-machine-learning! [accessed May 7, 2021].See section 4—Measurement bias.

Pham et al. ". Deep learning-based fake-banknote detection for the visually impaired people using visible-light images captured by smartphone camera", Retrieved from. IEEE Access, Mar. 30, 2020, 18 Pages.

* cited by examiner

230

| category | brand | serial number of QR code | openid | notify_time | ip |
|---|---|---|---|---|---|
| Hair | HS | 89964307767522 | orKdMSbJAUPROQKbOZ3eYcxnBnM8 | 01/04/2020 00:33 | 14.212.241.189 |
| Hair | H&S | 71500467084131 | orKdM5aGXnOjqnJlazgzPy1g | 01/04/2020 00:00 | 106.17.18.101 |
| Hair | HS | 83536603511077 | orKdM5Xugtm2i_T9lnfkg_JescOw | 01/04/2020 00:06 | 106.61.105.220 |
| Hair | H&S | 91616142304535 | orKdM5ariiggNm4CIlrOIBYLOk-M | 01/04/2020 00:14 | 182.139.78.136 |
| Hair | HS | 24045835405688 | orKdM5UpDGRh8qHPp5ieBnbYYOqo | 01/04/2020 00:24 | 112.96.71.104 |

232b 232c 232d

Counterfeit list

236

| | |
|---|---|
| 0 | P0804991462276684 |
| 1 | P5416543341534281 |
| 2 | P202104108100386CG |
| 3 | P9605647419309863 |
| 4 | P8414094348732274 |
| 5 | P0060470671288429 |
| 6 | P1416813340246214 |
| 7 | P0532838494319268 |
| ... | |
| *n* | *m* |

METHODS AND SYSTEMS FOR ENABLING ROBUST AND COST-EFFECTIVE MASS DETECTION OF COUNTERFEITED PRODUCTS

CROSS REFERENCE TO RELATED APPLICATION

This application claims the benefit of U.S. Provisional Application No. 63/297,821, filed Jan. 10, 2022, the substance of which is incorporated herein by reference.

FIELD

The present disclosure generally relates to artificial intelligence (AI) based steganographic systems and methods, and more particularly to, AI based steganographic systems and methods for detecting counterfeit products based on unique serialized printing codes.

BACKGROUND

Counterfeit items are a large problem in many industries, particularly in developing countries. They can erode consumer confidence or in extreme cases, cause actual, physical harm, and/or generate losses for manufacturers and distributors. Counterfeiting represents, globally, over $500 million in losses and damages the brand reputation of manufacturers and distributors. For example, a customer who receives a poor quality counterfeit may associate that bad experience with the brand. Even in developed markets, where counterfeiting is a more rare occurrence, significant brand risk exists. For example, a study from the 1990s on a poor-quality counterfeit shampoo released in Europe showed that on average a disappointed consumer told six people about a poorly performing product. In 2007, a toothpaste brand lost more than two market share points after reports of harmful counterfeit toothpaste in the U.S. appeared in the press. Counterfeit product with a black market value of $40 million is routinely seized and removed during customs stoppages and in-market raid checks and/or raid actions (e.g., by law enforcement personnel).

A variety of methods have been used over the years to allow the verification of the authenticity of items, including holographic labels, RFID tags, and overt and covert codes. Although these methods may provide a way to detect counterfeit items, they also involve additional costs and/or complexity to the production or otherwise manufacturing process. For example, adding a complex yet effective identifying mark (e.g., a data matrix code, a QR code, etc.) may require prohibitive capital expenses to replace and/or retrofit existing equipment (e.g., label printers/embossers). Other product tracking techniques such as those that rely on blockchain require consistent physical control of supply chains, which is not possible in many practical scenarios wherein a manufacturer or distributor lacks such control. Still further, existing counterfeit detection techniques do not utilize existing distributed mobile computing resources, e.g., via crowdsourcing.

A variety of techniques have recently been proposed that involve manipulation of existing codes and/or information provided on a product for tracking purposes. For example, WO 2012/109294 A1 discloses a method of printing a product code with one or more modified characters. The method uses an existing alphanumeric code that is determined by, for example, the date and location of manufacture, and existing printing technology. An algorithm is applied to digits in the original code (pre-modification), and based on the output of the algorithm, one or more digits in the code are selected and modified in a predetermined manner. For example, the modification may involve removal of a pixel of an individual digit that is barely perceptible to the naked eye, but that provides a clear signal to someone actively seeking to verify the authenticity of the product.

While such techniques are considerably useful in terms of helping manufacturers, retailers, and end users to ascertain the authenticity of products, counterfeiters are becoming more sophisticated at interpreting such codes and being able to replicate them. This problem becomes exacerbated for manufacturers or otherwise entities using imaging analysis to detect counterfeit items or products. This is because the ever increasing numbers of counterfeit items, each of which may have various shapes, sizes, and graphics—and, each of which may employ various techniques to mimic authentic products—can be vastly different in their configuration and/or appearance, even if such differences may be subtle in visual appearance. Such vast numbers of different counterfeit products and images create difficulties in building robust image based systems to combat product counterfeiting, at least because it is difficult for a manufacturer or entity to readily identify, gather, or otherwise access the various numbers and different types of counterfeit images of counterfeit products as created by different counterfeiters for building and developing robust and/or accurate systems.

For example, US 2019/0392458 A1, entitled "Method of Determining Authenticity of a Consumer Good," describes a method of classifying a consumer good as authentic, where the method leverages machine learning and the use of steganographic features on a given authentic consumer good. While the method may be used to identify steganographic features on authentic consumer good(s) for the purpose of authentication consumer goods, the method, and its underlying machine learning model, is limited because it relies on vast numbers of real-world images of non-authentic consumer goods, which can be prohibitively costly or time consuming to obtain, organize, structure, or otherwise aggregate. For the same reasons, data pre-processing and/or training of a robust machine-learning model with such real-world images of non-authentic consumer goods can cause errors and delays, or other issues in preparing or supervising the training dataset that would otherwise be required for generation of a robust machine learning model. This can include because such vast numbers of real-world images of non-authentic consumer goods may have different, unknown, and/or underrepresented depictions of non-authentic features, which would cause significant manual processing and/or manipulation to prepare a training dataset for generation of a robust machine learning model.

For the foregoing reasons, there is a need for AI based steganographic systems and methods for analyzing pixel data of a product to detect product counterfeiting, where such AI based systems are able to uniquely distinguish between products, while avoiding the overhead of analyzing the steganographic features of every candidate product image.

SUMMARY

Generally, as described herein, AI based steganographic systems and methods are disclosed for detecting product counterfeiting. Such AI based steganographic systems provide a digital imaging, and artificial intelligence, based solution for overcoming problems that arise from the difficulties in determining whether a product is authentic or counterfeit.

In an aspect, the invention is directed to using a smart phone to scan products (e.g., via optical recognition) in the marketplace to identify a product's batch/manufacturing code along with the location and time of the scan. If the distance and time between any two scans of a product having the same batch/manufacturing code is "impossible" (e.g., same code is scanned at about the same time on opposite sides of the country), the code is badlisted as one being copied by counterfeiters. This badlist of codes can be subsequently used to inform customers, consumers, and investigators that any products scanned in the future having a badlisted code is counterfeit. Subsequent analysis may skip the computationally expensive analysis if the batch code is known to be counterfeit based on the counterfeit list. Additional applications of the innovation may include the use of counterfeit location heat maps to help guide investigators.

As noted, counterfeits constitute a global problem. The manufacturing and producing industry has a need for more advanced resources and distributed involvement to identify counterfeits. Collecting more data through the crowdsourcing aspects of the present techniques enables data (so called "big data") to be collected, resulting in better counterfeiting detection. The present techniques also solve the long standing problem of how to do counterfeit detection at scale, without incurring significant capital and time expenditures, by leveraging smart phone infrastructure to collect and process digital images. With the present techniques, a manufacturer or distributor can crowd source images, and request or demand (e.g., via contractual obligation) that supply chain partners, recycling centres, and/or other points of disposal perform spot checks by scanning images of products. The present techniques leverage advantage of the information metadata in digital images (such as time, date, location data); scannable data (UPC, data matrix etc); and artwork from the product that can compared to known standards. Aspects of the present techniques comprise combining machine learning, steganographic features in artwork as well as serialized production printing to make products more difficult to copy and easier to detect as counterfeits.

An advantage of the invention is the relative ease by which counterfeit products can be identified and catalogued, and how results can be amplified by scaling the solution across crowdsourced users. Users can be given immediate feedback on established counterfeit products. Once counterfeit product is detected, particular features of the counterfeit product can be catalogued, by storing a corresponding batch code in a "counterfeit attribute list" (i.e., a BADlist). When consumers take photos containing a product having counterfeit attributes from the list, the system can easily respond back to the user can be immediately warned that the product is counterfeit. For example, if the counterfeiter simply copies an (almost) unique production code, the product code will be repeated many times by counterfeit products in the marketplace. And once identified as counterfeit, the specifically copied product code will go on the counterfeit attribute list. Yet another advantage of the invention is leveraging date/time/location data of images coupled with a high adoption/implemented rate for the system, to identify hot spots and trends data where investigative or law enforcement resources are best deployed.

Yet still another advantage is that the user does not need to type numbers or letters. Simple photo taking whereas counterfeit detection is simply done by analysing images or data (metatag, scannable codes etc.) from the images. This helps drive adoption, because capturing an image is one of the most basic and informationally rich operations of a smart phone, representing a low-barrier of entry into the system, and including no complicated instructions. The AI based steganographic systems and methods generally comprise training AI based model(s) (e.g., one or more neural network based models, computer vision models, and/or optical character recognition (OCR) models) to systematically identify a time stamp and/or a counter digit within a printed product code. In some aspects, the timestamp and/or counter digit may enable the present techniques to uniquely identify a product and recognize authentic or genuine products. In some aspects, the present techniques may determine authenticity based on authentic or genuine batch codes, artwork, labels, or the like of a product appearing in an image of the product.

Conventionally, collecting sufficient examples of AI model training images of counterfeit products has been impractical for the company or its investigators to collect. The recent adoption of smart phones by consumers enables the present techniques to collect examples of images of both authentic and counterfeit products that may be used to train one or more AI models (i.e., crowdsourcing). This can include images of different products in different markets, each of which may have different artwork, batch codes, labels, etc.

Accordingly, the disclosure herein provides solutions that allow for development of a robust, enhanced, and accurate system. The disclosure herein provides inventive features comprising the training of an AI model to detect whether deliberately added authenticating features (e.g., as added packaging and/or printed codes) are present or not within an image of a product, and the training of the model or a second model to identify one or more batch codes and one or more serialized digit codes. This can include whether certain authenticating features are present or absent within the image of a product.

For example, in an aspect involving barcodes, training an AI based imaging model may require inputting, into an AI training algorithm, thousands of images of barcodes, with and without the added security features, which may include authenticating features as described herein. The barcodes used to train the AI model may comprise barcodes lacking or devoid of the authenticating features. In some aspects, such images may comprise synthesized (or generated) examples of counterfeit images, where such synthesized examples include modified versions of authentic images, where, for example, authenticating features within the image are deleted, modified, or otherwise altered. Using such synthesized images allow the AI model to be generated quickly, without the need for vast numbers of images of real-world counterfeits, while allowing a robust feature detection model. In addition, the present disclosure has broad scope, essentially directed to synthesizing, testing, and using examples of any steganographic feature (e.g., within an image) for purposes of generating, training, and/or building robust AI models and related systems and methods.

In another aspect involving artwork, training an AI based imaging model may include training a steganographic imaging model using a first set of training images depicting one or more authentic steganographic features, and a second set of training images depicting a lack of the one or more authentic steganographic features. In other words, a training data set may be partitioned into a set of authentic and inauthentic images, wherein the images are of products and the authenticity refers to the respective presence or absence of certain features in the artwork of those products.

The AI based steganographic systems as described herein allow many users (e.g., thousands or more) to submit images of products to an imaging server(s) (e.g., including its one or more processors) via a computing device (e.g., a user mobile device), where the imaging server(s) or user computing device, implements or executes an artificial intelligence based AI based imaging model trained with pixel data of the training images.

The steganographic based imaging model may be configured to analyze input pixel data of input digital images, each input digital image depicting the presence or lack of one or more steganographic features, and to output respective indications of whether the respective input digital images are authentic or counterfeit. For example, at least one portion of an image of product can comprise pixels or pixel data may indicate a pixel-based feature presence or absence of the one or more authentic steganographic features. In some aspects, the image classification, or related indication of authentication or counterfeiting, may be transmitted via a computer network to a user computing device of the user for rendering on a display screen. In other aspects, no transmission to the imaging server of the user's specific image occurs, where the classification, or related indication of authentication or counterfeiting may instead be generated by the AI based imaging model, executing and/or implemented locally on the user's mobile device and rendered, by a processor of the mobile device, on a display screen of the mobile device. In various aspects, such rendering may include graphical representations, overlays, annotations, and the like for addressing the feature in the pixel data.

The steganographic based imaging model may be electronically accessible by a counterfeit product detection application of a mobile computing device of the end user (e.g., an iPhone application, an Android application, a tablet application, etc.). The application may be configured, when executed by the one or more processors, to cause the one or more processors to obtain a digital image of a physical product of a product line, wherein the digital image is captured by an imaging device and the digital image includes comprising pixel data. For example, the digital image of the physical product of the product line may be a photograph of a bottle of HEAD & SHOULDERS shampoo, captured by the user using the mobile computing device. The capture may occur, for example, when the end user is shopping in a store prior to making a purchase, after making a purchase, or at another time. In some aspects, the user may be located at a recycling center or another product "end-of-life" location.

In some aspects, the application may be configured, when executed by the one or more processors, to cause the one or more processors to analyze the digital image to detect within the pixel data a batch code uniquely identifying a batch of the physical product of the product line. The batch code may be an alphanumeric code, as known in the art. In some aspects, the application may be configured, when executed by the one or more processors, to analyze the pixel data of the digital image to determine that the batch code is counterfeit. The batch code may include one or more steganographic features and/or one or more numeric, alphabetic or alphanumeric codes that may be converted to machine-readable text via an optical character recognition process, a deep learning process, etc. The determination that the batch code is counterfeit may include analyzing the included steganographic features and/or the codes by, for example, determining whether the steganographic features and/or machine-readable text are authentic.

The application may be configured, when executed by the one or more processors, to augment a counterfeit list of batch codes to include the batch code, wherein the counterfeit list of batch codes remains electronically accessible to the counterfeit product detection app for one or more further counterfeit detection iterations. The counterfeit list of batch codes may be referred to herein as a badlist, a bad list or a counterfeit list. Specifically, the counterfeit list of batch codes (e.g., the counterfeit list 263 of FIG. 2B) may include one or more batch codes including the batch code. Once the counterfeit list is augmented with a particular batch code, the present techniques may reference the counterfeit list rather than performing a de novo analysis of steganographic features of artwork or serialized codes each time an image is received. Thus, a primary benefit of the present techniques over the prior art is that subsequent analysis requires only a cross-reference check against the counterfeit list of a serialized code, which is much faster and requires far fewer computational resources (e.g., CPU cycles) than image analysis to determine the presence or absence of steganographic features indicative of a counterfeit good. The bad list may store batch codes that include a time stamp to which is appended a serialized digit, in some instances.

In various aspects, the counterfeit and imaging detection systems and methods may comprise or use one or more processors; a counterfeit product detection application (app) including computing instructions configured to be executed by the one or more processors; and a steganographic imaging model, electronically accessible by the counterfeit product detection app, and trained using a first set of training images depicting one or more authentic steganographic features, and a second set of training images depicting a lack of the one or more authentic steganographic features. The steganographic imaging model may be configured to analyze input pixel data of respective input digital images. Each input digital image may depict the presence or lack of one or more steganographic features. The steganographic imaging model may further be configured to output respective indications of whether the respective input digital images are authentic or counterfeit. The computing instructions of the counterfeit product detection app, when executed by the one or more processors, may be configured to cause the one or more processors to: (1) obtain a digital image of a physical product of a product line, the digital image captured by an imaging device and the digital image comprising pixel data, (2) analyze the digital image to detect within the pixel data a batch code uniquely identifying a batch of the physical product of the product line, (3) analyze the pixel data of the digital image to determine that the batch code is counterfeit, and (4) augment a counterfeit list of batch codes to include the batch code. The counterfeit list of batch codes can be configured to remain electronically accessible to the counterfeit product detection app for one or more further counterfeit detection iterations.

In accordance with the above, and with the disclosure herein, the present disclosure includes improvements in computer functionality or in improvements to other technologies at least because the disclosure describes that, e.g., an imaging server, or otherwise computing device (e.g., a user computer device), is improved where the intelligence or predictive ability of the imaging server or computing device is enhanced by a trained (e.g., machine learning trained) AI based imaging model. The AI based imaging model, executing on the imaging server or computing device, is able to more accurately detect, based on pixel data of real-world or synthesized images of products, pixel-based feature presence or absence of the one or more authentic steganographic features to determine an image classification of the product and detect whether the product is authentic or counterfeit based on the image classification and the further addition of a counterfeit list that caches known counterfeit batch codes in global circulation. That is, the present disclosure describes improvements in the functioning of the computer itself or "any other technology or technical field" because an imaging server or user computing device is enhanced with a plurality of training images (e.g., 10,000s of training images and related pixel data as feature data) to accurately predict, detect, or determine pixel data of product images, such as newly provided product images, and to this, a caching system is added that keeps track of known globally counterfeit products, to enable a much more timely and accurate determination of a counterfeit good.

This improves, in the field of machine-aided, digitally enabled global counterfeit detection, over the prior art at least because existing systems lack such predictive or classification functionality and are simply not capable of accurately analyzing, with a trained model, real-world and synthesized images to output a predictive result to address at least one feature identifiable within the pixel data comprising image classifications for detecting whether the product is authentic or counterfeit based on the image classification and further, to build a global counterfeit list of known counterfeit batch codes, in a way that leverages the crowd-sourcing capabilities of distributed mobile computing devices, in some aspects.

It will be appreciated by those of skill in the art that the constructed counterfeit list is useful for the manufacturer/distributor to determine the authenticity of products, but also for third parties. That is, in some aspects, the manufacturer/distributor may make the counterfeit list available to third parties (e.g., a retailer) for the third parties' use in determining the authenticity of products.

In some aspects, the present techniques may train one or models using synthetic training images, such that a vast number of real-world images of counterfeit products are not required. This represents yet another improvement over the prior art, insofar as this synthetic training paradigm allowing for rapid training of accurate AI models and digital and/or artificial intelligence based analysis of synthesized (and real-world) images of products for outputting a predictive result and/or classification to detect whether the product is authentic or counterfeit based on the image classification.

In addition, the present disclosure relates to improvement to other technologies or technical fields at least because the present disclosure describes or introduces improvements to computing devices in printers or, more generally in the field of steganographic printing, whereby the trained AI based imaging model executing on the imaging device(s) or computing devices is communicatively coupled to a printer and improves the underlying computer device (e.g., imaging server(s) and/or user computing device), where such computer devices are made more efficient by the configuration, adjustment, or adaptation of a given machine-learning network architecture to provide unique printed codes or values on physical products. For example, in some aspects, fewer machine resources (e.g., processing cycles or memory storage) may be used by decreasing computational resources by decreasing machine-learning network architecture needed to analyze images, including by reducing depth, width, image size, or other machine-learning based dimensionality requirements. Such reduction frees up the computational resources of an underlying computing system, thereby making it more efficient.

In addition, the present disclosure includes applying certain of the claim elements with, or by use of, a particular machine, e.g., a printer, including continuous ink jet, thermal ink jet, drop on demand, thermal transfer printers, or laser ablation or other laser marking devices, hot-melt wax printers, for printing anti-counterfeit codes or otherwise features on one or more products or substrates thereof, where such printed codes or otherwise features may then be captured in digital images for the use with an AI based imaging model for classifying the image to detect whether the product is authentic or counterfeit based on the image classification.

In addition, the present disclosure includes specific features other than what is well-understood, routine, conventional activity in the field, or adds unconventional steps that confine the claim to a particular useful application, e.g., analyzing pixel data of a product to detect product counterfeiting.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein.

The Figures depict preferred aspects for purposes of illustration only. Alternative aspects of the systems and methods illustrated herein may be employed without departing from the principles of the invention described herein.

DETAILED DESCRIPTION OF THE INVENTION

Figure 1:
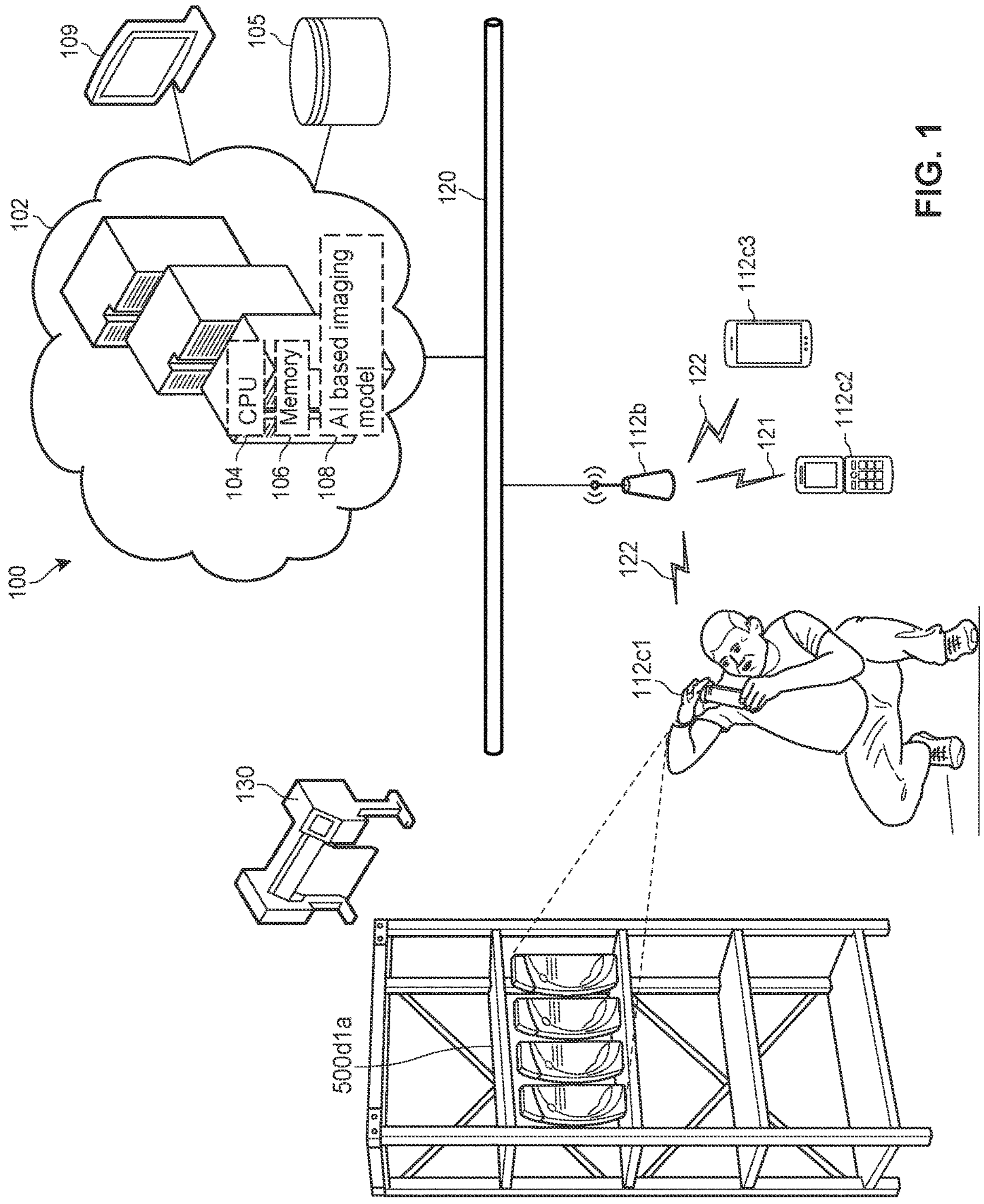
FIG. 1 illustrates an example artificial intelligence (AI) based steganographic system configured to analyze pixel data of a product to detect product counterfeiting and augment a counterfeit list based on the analysis, in accordance with various aspects disclosed herein.

FIG. 1 illustrates an example artificial intelligence (AI) based counterfeit and imaging detection system 100 configured to analyze pixel data of image(s) (e.g., of any one or more of the images depicted in FIG. 2A, 2B, 3A, 3B or 3C) of a product of one or more product lines to detect product counterfeiting, in accordance with various aspects disclosed herein. In the example aspect of FIG. 1, AI based counterfeit and imaging detection system 100 includes server(s) 102, which may comprise one or more computer servers. In various aspects, server(s) 102 comprise multiple servers, which may comprise multiple, redundant, or replicated servers as part of a server farm. In still further aspects, server(s) 102 may be implemented as cloud-based servers, such as a cloud-based computing platform. For example, imaging server(s) 102 may be any one or more cloud-based platform(s) such as MICROSOFT AZURE, AMAZON AWS, or the like. Server(s) 102 may include one or more processor(s) 104 as well as one or more computer memory 106. In various aspects, server(s) 102 may be referred to herein as "imaging server(s)."

Memory 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memory 106 may store an operating system (OS) (e.g., Microsoft Windows, Linux, UNIX, etc.) capable of facilitating the functionalities, apps, methods, or other software as discussed herein. Memory 106 may also store a AI based imaging model 108, which may be an artificial intelligence based model, such as a machine learning model, neural network model, convolutional neural network (CNN) model, or the like, trained on various images (e.g., images or labels 202 of FIG. 2A, image 222 of FIG. 2B, images 302 and/or images 304 of FIG. 3A, images at blocks 314 of FIG. 3B, and/or images 334 of FIG. 3C), as described herein. As described herein, AI based imaging model 108 may be a steganographic imaging model, and may be accessible by a counterfeit product detection app. AI based imaging model 108 may be trained with pixel data of a plurality of training images depicting one or more authentic steganographic features and a second set of training images depicting a lack of the one or more authentic steganographic features. For example, the authentic and inauthentic steganographic images may correspond, respectively, to the images 334*a* and 334*b* of FIG. 3C. In addition, AI based imaging model 108 is configured to analyze the pixel data of one or more digital image to determine whether a batch code contained in the pixel data is counterfeit. In a first aspect, the determination of a counterfeit product may be based on steganographic features. In another aspect, the determination may be reached by reference to a counterfeit product list (i.e., a counterfeit list/badlist, such as the counterfeit list 236 of FIG. 2B).

AI based imaging model 108 may be stored in database 105, which is accessible or otherwise communicatively coupled to imaging server(s) 102. In addition, memory 106 may also store machine readable instructions, including any of one or more application(s) (e.g., a counterfeit product detection application (app) as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, an imaging based machine learning model or component, such as the AI based imaging model 108, where each may be configured to facilitate their various functionalities discussed herein. It should be appreciated that one or more other applications are envisioned, such as the counterfeit product detection app, and that are executed by the processor(s) 104. The one or more APIs may provide, for example, third party access to a counterfeit product list stored in the database 105.

The processor(s) 104 may be connected to the memory 106 via a computer bus (not depicted) responsible for transmitting electronic data, data packets, or otherwise electronic signals to and from the processor(s) 104 and memory 106 in order to implement or perform the machine readable instructions, methods, processes, elements or limitations, as illustrated, depicted, or described for the various flowcharts, illustrations, diagrams, figures, and/or other disclosure herein.

Processor(s) 104 may interface with memory 106 via the computer bus to execute an operating system (OS). Processor(s) 104 may also interface with the memory 106 via the computer bus to create, read, update, delete, or otherwise access or interact with the data stored in memory 106 and/or the database 105 (e.g., a relational database, such as Oracle, DB2, MySQL, or a NoSQL based database, such as MongoDB). The data stored in memory 106 and/or database 105 may include all or part of any of the data or information described herein, including, for example, training images and/or new images (e.g., including any one or more of the images depicted in subsequent FIGs. herein), or other images and/or information of the user, including alphanumeric codes, artwork, batch codes, product labels, graphics, logos, or the like, or as otherwise described herein, in addition to the counterfeit product list.

Imaging server(s) 102 may further include a communication component configured to communicate (e.g., send and receive) data via one or more external/network port(s) to one or more networks or local terminals, such as computer network 120 and/or a terminal 109 (for rendering or visualizing) described herein. In some aspects, imaging server(s) 102 may include a client-server platform technology such as ASP.NET, Java J2EE, Ruby on Rails, Node.js, a web service or online API, responsive for receiving and responding to electronic requests. The imaging server(s) 102 may implement the client-server platform technology that may interact, via the computer bus, with the memory(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein.

In various aspects, the imaging server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some aspects, computer network 120 may comprise a private network or local area network (LAN). Additionally, or alternatively, computer network 120 may comprise a public network such as the Internet.

Imaging server(s) 102 may further include or implement an operator interface configured to present information to an administrator or operator and/or receive inputs from the administrator or operator. An operator interface may provide a display screen (e.g., via the terminal 109). Imaging server(s) 102 may also provide I/O components (e.g., ports, capacitive or resistive touch sensitive input panels, keys, buttons, lights, LEDs), which may be directly accessible via, or attached to, imaging server(s) 102 or may be indirectly accessible via or attached to the terminal 109. According to some aspects, an administrator or operator may access the server 102 via the terminal 109 to review information, make changes, input training data or images, initiate training of AI based imaging model 108, and/or perform other functions.

As described herein, in some aspects, imaging server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the model(s), such as AI models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memory 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

As shown in FIG. 1, imaging server(s) 102 are communicatively connected, via computer network 120 to the one or more user computing devices 112 via base station 112*b*. In some aspects, base station 112*b* may comprise a cellular base station, such as cell tower(s), communicating to the one or more user computing devices 112*c*1-112*c*3 via wireless communications 121 based on any one or more of various mobile phone standards, including NMT, GSM, CDMA, UMMTS, LTE, 5G, or the like. Additionally or alternatively, a base station 112*b* may one or more comprise routers, wireless switches, or other such wireless connection points communicating to the one or more user computing devices 112*c*1-112*c*3 via wireless communications 122 based on any one or more of various wireless standards, including by non-limiting example, IEEE 802.11a/b/c/g (WIFI), the BLUETOOTH standard, or the like.

Any of the one or more user computing devices 112*c*1-112*c*3 may comprise mobile devices and/or client devices for accessing and/or communicating with imaging server(s) 102. Such mobile devices may comprise one or more mobile processor(s) and/or a digital camera for capturing images, such as images as described herein (e.g., any one or more of images or image sets 500*a* to 500*f* as described for FIGS. 5A to 5G herein). In various aspects, user computing devices 112*c*1-112*c*3 may comprise a mobile phone (e.g., a cellular phone), a tablet device, a personal data assistance (PDA), a wearable device, or the like, including, by non-limiting example, an APPLE iPhone or iPad device or a GOOGLE ANDROID based mobile phone or tablet. It should be appreciated that scenarios are envisioned in which many users (e.g., thousands or more) each use respective heterogeneous personal mobile computing devices, such as in a crowdsourcing scenario.

In additional aspects, user computing devices 112*c*1-112*c*3 may comprise a retail computing device. A retail computing device may comprise a user computer device configured in a same or similar manner as a mobile device, e.g., as described herein for user computing devices 112*c*1-112*c*3, including having a processor and memory, for implementing, or communicating with (e.g., via server(s) 102), as described herein. Additionally, or alternatively, a retail computing device may be located, installed, or otherwise positioned within a retail environment to allow users and/or customers of the retail environment to utilize the AI based steganographic systems and methods on site within the retail environment. For example, the retail computing device may be installed within a kiosk for access by a user. The user may then upload or transfer images (e.g., from a user mobile device) to the kiosk to implement the AI based steganographic systems and methods described herein. Additionally, or alternatively, the kiosk may be configured with a camera to allow the user to take new images to detect counterfeit product(s) and/or for upload and transfer to server(s) 102. In such aspects, the user would be able to use the retail computing device to receive and/or have rendered an indication of whether the product is authentic or counterfeit, as described herein, on a display screen of the retail computing device.

In various aspects, the one or more user computing devices 112*c*1-112*c*3 may implement or execute an operating system (OS) or mobile platform such as Apple's iOS and/or Google's Android operation system. Any of the one or more user computing devices 112*c*1-112*c*3 may comprise one or more processors and/or one or more memory for storing, implementing, or executing computing instructions or code, e.g., an application (app), as described in various aspects herein. As shown in FIG. 1, AI based imaging model 108 and/or an imaging application as described herein, or at least portions thereof, may also be stored locally on a memory of a user computing device (e.g., user computing device 112*c*1).

User computing devices 112*c*1-111*c*3 and/or 112*c*1-112*c*3 may comprise a wireless transceiver to receive and transmit wireless communications 121 and/or 122 to and from base station 112*b*. In various aspects, pixel based images (e.g., images in subsequent figures herein) may be transmitted via computer network 120 to imaging server(s) 102 for training of model(s) (e.g., AI based imaging model 108) and/or imaging analysis as described herein.

Figure 2A:
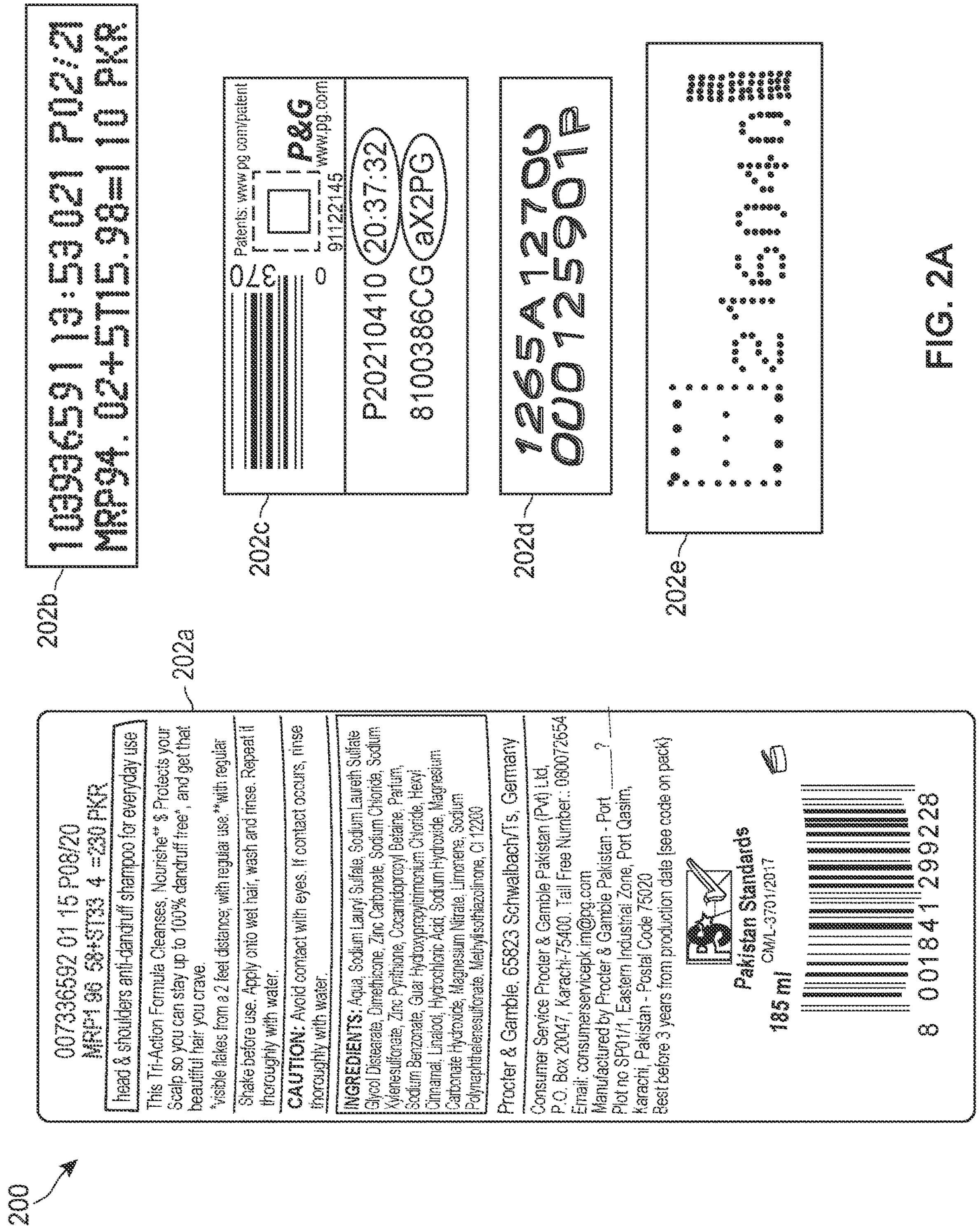
FIG. 2A illustrates exemplary physical products of one or more respective product lines including one or more respective covert feature and batch code printing techniques.

In addition, the one or more user computing devices 112*c*1-112*c*3 may include a digital camera and/or digital video camera for capturing or taking digital images and/or frames (e.g., which can be any one or more of images or image sets depicted herein in subsequent FIGs., such as product label 202 as shown in FIG. 2A). Each digital image may comprise pixel data for training or implementing model(s), such as AI or machine learning models, as described herein. For example, a digital camera and/or digital video camera of, e.g., any of user computing devices 112*c*1-112*c*3, may be configured to take, capture, or otherwise generate digital images of products and, at least in some aspects, may store such images in a memory of a respective user computing devices. Additionally, or alternatively, such digital images may also be transmitted to and/or stored on memory 106 and/or database 105 of server(s) 102.

Still further, each of the one or more user computer devices 112*c*1-111*c*3 and/or 112*c*1-112*c*3 may include a display screen for displaying graphics, images, text, product authentication or counterfeit information, data, pixels, features, and/or other such visualizations or information as described herein. In various aspects, graphics, images, text, product authentication or counterfeit information, data, pixels, features, and/or other such visualizations or information may be received from imaging server(s) 102 for display on the display screen of any one or more of user computer devices 112*c*1-112*c*3. Additionally, or alternatively, a user computer device may comprise, implement, have access to, render, or otherwise expose, at least in part, an interface or a graphic user interface (GUI) for displaying text and/or images on its display screen.

The user may use the computing device 112*c*1, for example, to capture one or more images of a product in image 500*d*1*a*. The product corresponding to the images of the product in image 500*d*1*a* may be any suitable product of the manufacturer/distributor, such as a baby care product, a fabric care product, a family care product, a feminine care product, a grooming product, a hair care product, a home care product, an oral care product, a personal health care product, a skin & personal care product, a clear product, etc.

In some aspects, computing instructions and/or applications executing at the server (e.g., server(s) 102) and/or at a mobile device (e.g., mobile device 112*c*1) may be communicatively connected for analyzing pixel data of an image or image sets (e.g., the image 222 of FIG. 2B) for detecting whether a corresponding product is authentic or counterfeit based on the image classification and/or the presence of information included in the image in a counterfeit list, as described herein. For example, one or more processors (e.g., processor(s) 104) of server(s) 102 may be communicatively coupled to a mobile device via a computer network (e.g., computer network 120). In such aspects, an imaging app may comprise a server app portion configured to execute on the one or more processors of the server (e.g., server(s) 102) and a mobile app portion configured to execute on one or more processors of the mobile device (e.g., any of one or more user computing devices 112*c*1-112*c*3). In such aspects, the server app portion is configured to communicate with the mobile app portion. The server app (i.e., the counterfeit product detection app) portion or the mobile app portion may each be configured to implement, or partially implement, one or more of: (1) obtaining a digital image of a physical product of a product line, the digital image captured by an imaging device and the digital image comprising pixel data, (2) analyzing the digital image to detect within the pixel data a batch code uniquely identifying a batch of the physical product of the product line, (3) analyzing the pixel data of the digital image to determine that the batch code is counterfeit, and (4) augment a counterfeit list of batch codes to include the batch code, wherein the counterfeit list of batch codes remains electronically accessible to the counterfeit product detection app for one or more further counterfeit detection iterations.

FIG. 1 further comprises printer 130. In various aspects, printer 130 is connected via network 120 to server(s) 102 and may receive print submissions or commands to print product code(s), steganographic features, batch codes, or other features on products or substrates of products. For example, printer 130 may comprise an online printer and may be configured for printing in various mediums or in different ways (e.g., continuous inkjet, laser, thermal transfer, embossed, etc.). In some aspects, printer 130 is a printer under the direction or control of the owner or operator of server(s) 102, where printer 130 is part of a same network. In other aspects, printer may be a printer under the direction or control of a third-party and may be connected to server(s) 102 via the Internet. Herein, a batch code generally comprises a serialized code (e.g., a timestamp and/or integer serial number and/or alphanumeric serial number).

The batch code may be formatted such that as the printer 130 is in operation, the wall clock time forms the first part of the batch code, and a serial digit is appended to the wall clock time by a counter within each minute. For example, the printer may print 1024 labels in a first minute. Each respective batch code may include a timestamp with, for example, microsecond precision, plus a number from 0-1023. In the next minute, the counter may be reset, such that the next set of printed batch codes include a new set of numbers beginning with 0. It will be appreciated by those of ordinary skill in the art that this scheme enables products to be uniquely identified with datetime and serial precision. Further, it will be appreciated that alternative schemes of serialization and unique marking are possible including without limitation hexadecimal encodings, random number encodings, hash function encodings, one hot encodings, etc. However, it will be appreciated by those of ordinary skill in the art that a primary advantage of the present techniques is that existing printing setups can be quickly and inexpensively upgraded, whereas more complex schemes may require prohibitive upgrade time and expense.

Printer 130 is controlled to print a product code on a substrate, including continuous ink jet, thermal ink jet, drop on demand, thermal transfer printers, or laser ablation or other laser marking devices, hot-melt wax printers. A further aspect could be the use of a digital artwork printer to print the code. The substrate may be any desired substrate, including porous and non-porous materials, primary and secondary packaging, and the products themselves, typically consumer products.

In various aspects, processor(s) 104 of sever(s) 102 are configured to execute instructions to select a set of one or more authentic steganographic features for printing on a different version of a product. The different version of the product may be an old or previous product where the artwork may have changed. Moreover, a same product may have different versions of different steganographic features in the artwork. In some aspects, a single SKU or alphanumeric code of a product may have different variations when it comes to artwork and steganographic features incorporated therein.

Processor(s) 104 of sever(s) 102 may be further configured to execute instructions to generate a print submission for printing or augmenting, by printer 130 on a substrate of the different version of the product, the set of the one or more authentic steganographic features. The print submission may be sent by server(s) 102 over network 120 to printer 130 for printing labels, batch codes, artwork (having the authentic steganographic features) on the product or substrate of the product.

The processor(s) 104 of server(s) 102 may be further configured to print the serialized codes referenced above to include steganographic features. That is, the timestamp and/or serialized digits printed on the product may themselves be modified to include steganographic features.

FIG. 2A illustrates exemplary physical products 200 of one or more respective product lines including one or more respective covert feature and batch code printing techniques. The exemplary artwork and batch codes include a product label 202*a* that comprises a barcode, artwork and a batch code, any (and all) of which may include independent steganographic features generated by the processor(s) 104 of FIG. 1 and capable of being recognized by the AI model 108 of FIG. 1. The artwork and batch codes may include static covert features (e.g., steganographic features) and unique codes, such as a time and counter, as depicted in the product label 202*a* and product label 202*b*. The static covert features may be implemented by the printer 130, for example in a plant of the manufacturer. In some aspects, the covert features may be implemented by printer suppliers, such as in anti-counterfeit ready printers (e.g., DOMINO, MARKEM IMAJE, and VIDEOJET). Such devices may include covert features such as dynamic fonts, linked codes, alpha-numeric codes/checksums, bespoke fonts designed by the manufacturer, and double drop Inkjet printing. As shown in the product label 202*a*, barcode features may include SONOCO-TRIDENT and black label text features. The memory 106 of FIG. 1 may include instructions for printing the covert features, and may be selected by the operator at runtime.

In an aspect, a DOMINO product label 202*c* includes a batch code (P202104108100386CG), a date time (e.g., HH:MM:SS) and an alphanumeric code (i.e., dX2PG) that is automatically calculated and printed. The alphanumeric code may a serialized portion of the code. A unique alphanumeric code may be generated and printed for every date/time/plant code combination. Each code may be visually unique and printed separately from the product artwork, representing an improvement over prior art techniques that are not visually distinct and thus, enable copyists to print the code as part of artwork. That is, counterfeiters often make a printing plate that include a product code and print all labels using that one printing plate. The alphanumeric code may be stored in the database 105, enabling the code to be checked by a brand protection operator at a later time. In some aspects a VIDEOJET product label 202*d* and/or a MARKEM IMAJE product label 202*e* may be applied to the product by the printer 130 in addition to, or alternatively from, the DOMINO product label 202*c*. It will be appreciated by those of ordinary skill in the art that the present techniques may use any suitable technique for unique marking, whether now known or later developed.

Figure 2B:
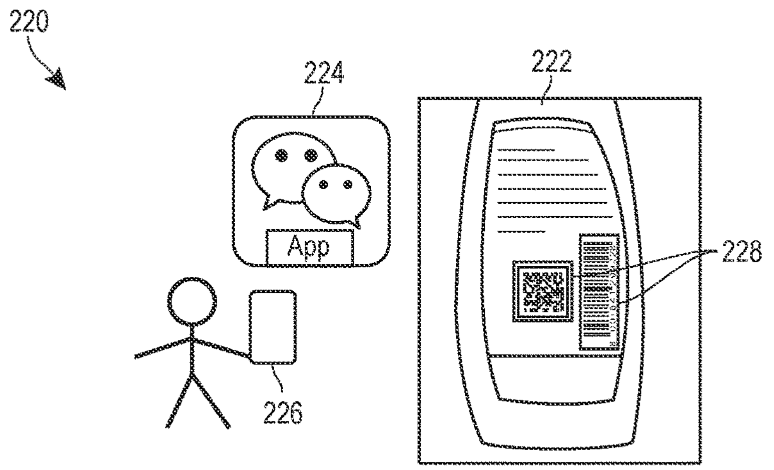
FIG. 2B illustrates an exemplary block diagram of a user obtaining an image of a physical product using a counterfeit product detection application, whereupon the digital image is analyzed using a steganographic imaging model and/or a counterfeit list of batch codes is analyzed, potentially including metadata of the obtained image, according to one scenario.
Figure 2B:
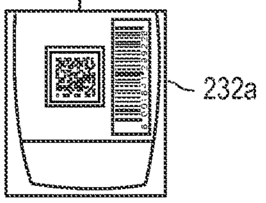

FIG. 2B illustrates an exemplary block diagram 220 of a user obtaining an image of a physical product 222 using a counterfeit product detection application 224 of a mobile computing device 226, whereupon pixel data 228 of the digital image is analyzed using a steganographic imaging model and/or a counterfeit list of batch codes, according to one aspect of the present techniques. The physical product 222 may correspond to the product in the images 500*d*1*a* of FIG. 1 and/or the products 202 of FIG. 2A, for example. The app 224 may correspond to the counterfeit product detection app discussed above with respect to FIG. 1. The mobile computing device 226 may correspond to any of the user computing devices 112 of FIG. 1. The pixel data 228 may be obtained by a camera of the user computing devices 112*c*1, for example, and may include one or more covert features (e.g., steganographic elements, batch codes including date-times and/or serialization codes, etc.) as discussed with respect to FIG. 2A. For example, the area of the image including pixel data 228 may include an authentic steganographic feature in the form of a raised or embossed element printed on a surface of substrate of product of image 500*d*1*a*. In some aspects, an AI based imaging model (e.g., AI based imaging model 108) may be trained with an image 500*d*1*a* to identify the authentic steganographic feature.

In other aspects, once trained, AI based imaging model (e.g., AI based imaging model 108) may be used to receive a new image of the product (e.g., of image 500*d*1*a*) obtain a digital image of a physical product of a product line (e.g., the product 222), the digital image captured by an imaging device and the digital image comprising pixel data (e.g., the pixel data 228). As shown in a table 230 of FIG. 2A, the AI based imaging model may analyze an image of the physical product 222 to detect information within the pixel data 228. For example, the AI based imaging model may determine one or more steganographic features (not depicted), a category (e.g., Hair), a brand (e.g., Head and Shoulders), a serial number or a batch code 232*a* uniquely identifying a batch of the physical product of the product line, an open id 232*b* identifying the user of the mobile device 226, a scan or notify time 232*c*, and/or an IP address 232*d* of the mobile computing device 226. The AI based imaging model may store the information in the table 230 in the database 105 of FIG. 1, for example.

The counterfeit product detection app may analyze the pixel data of the digital image to determine that the batch code is counterfeit. For example, as depicted in FIG. 2A, the counterfeit product detection app may cross-reference the batch code 232*a* with a counterfeit list 236 (i.e., a bad list) of known counterfeit batch codes. The counterfeit list 236 may be a indexed list, as depicted in FIG. 2B, of length n containing the m known counterfeit batch code, where n is any positive integer. The counterfeit list 236 includes one or more batch codes known to be counterfeit. For example, in the depicted example of FIG. 2B, batch code at the third index position (i.e., the value at index position 2 in the counterfeit list) corresponds to a known counterfeit batch code depicted in product label 202*c* of FIG. 2A (i.e., the code P202104108100386CG). It will be appreciated by those of ordinary skill in the art that in some embodiments, the batch code may include other aspects include in the label 202*c*, such as the HH:MM:SS timestamp and/or the serialized code (dX2PG). Further, as shown in the example of FIG. 2A, the batch code may include one or more blank space character, such as whitespace, a line break, etc.

In the event that the AI based imaging model determines that the one or more steganographic features are missing or indicative that the product 222 is counterfeit, the counterfeit product detection app may augment the counterfeit list of batch codes to include the batch code, for example by appending the corresponding batch code 232*b* of the product to the counterfeit list 236 (e.g., via an SQL INSERT command). In some cases, the counterfeit product detection app may increment an accumulated counter value if the batch code 232*b* already exists in the database. This provides a global count of counterfeit products submitted (e.g., via crowdsourcing), thereby presenting a significant advantage over conventional techniques that may be capable of detecting counterfeiting, but which lack any way of determining the magnitude of copying. It will be appreciated by those of ordinary skill in the art that the accumulated counter values may be cross-referenced to geolocation data and the stored IP addresses 232*d*, for example, to generate a map view showing the magnitude of reported counterfeit products in real-time. This presents yet another improvement to the field of computer-aided real-time counterfeit tracking techniques, allowing investigators to intervene in areas rife with counterfeit products. The counterfeit list of batch codes 236 remains electronically accessible to the counterfeit product detection app for one or more further counterfeit detection iterations via its storage in a persistent (non-transitory) electronic database, such as the database 105.

In some aspects, computing instructions of the counterfeit product detection app, when executed by the one or more processors of a computing device (e.g., user computing device 112*c*1), are configured to cause the one or more processors to render, on a display screen of the computing device, an indication of whether the product is authentic or counterfeit. In this way, an interested party (e.g., a consumer, an investigator, etc.) may determine whether a product is counterfeit immediately.

Additionally, or alternatively, in some aspects, computing instructions of the counterfeit product detection app, when executed by the one or more processors of a computing device (e.g., user computing device 112*c*1), are configured to cause the one or more processors to render, on a display screen (e.g., display screen 201) of the computing device, a visual or graphic indication of a pixel-based feature presence or absence of the one or more authentic steganographic features within the new image of the product. For example, a feature may be visually or graphically annotated with highlighting, colors, zooming, circling, etc. to indicate that a steganographic feature is present in image 500*d*1*a*. In other aspects, where no feature is present, a message or graphic (not shown) may be displayed or shown to indicate that no such feature is shown. Such message or graphic may indicate that the product is counterfeit because the feature (e.g., authentic steganographic feature) is missing or not found in the image.

In some aspects, a user may provide a new image that may be transmitted to imaging server(s) 102 for updating, retraining, or reanalyzing by AI based imaging model 108. In other aspects, a new image that may be locally received on computing device 112*c*1 and analyzed, by AI based imaging model 108, on the computing device 112*c*1. In various aspects, the visual or graphic indication of a pixel-based feature presence or absence of one or more authentic steganographic features within the new image of the product (e.g., product in image 500*d*1*a*) and/or an indication of whether the product is authentic or counterfeit may be transmitted via the computer network, from server(s) 102, to the user computing device of the user for rendering on the display screen of the user computing device (e.g., user computing device 112*c*1). In other aspects, no transmission to the imaging server of the user's new image occurs, where the visual or graphic indication of a pixel-based feature presence or absence of one or more authentic steganographic features within the new image of the product (e.g., product 222) and/or an indication of whether the product is authentic or counterfeit may instead be generated locally, by the AI based imaging model (e.g., AI based imaging model 108) executing and/or implemented on the user's mobile device (e.g., user computing device 112*c*1) and rendered, by a processor of the mobile device, on a display screen of the mobile device (e.g., user computing device 112*c*1).

Figure 3A:
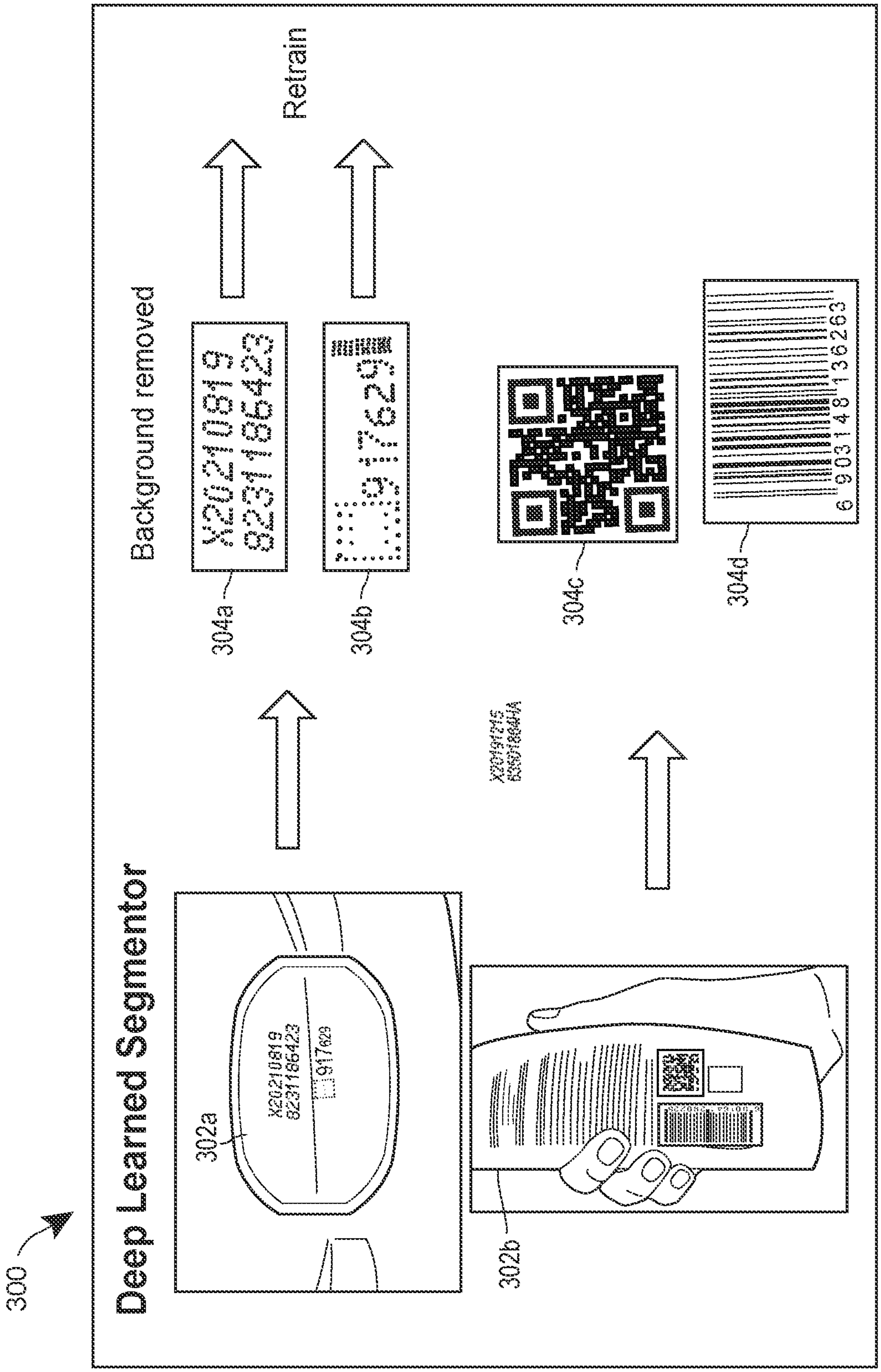
FIG. 3A illustrates operation of an exemplary deep learned artificial intelligence (AI) based segmentor model for analyzing pixel data of a product to isolate product codes, in accordance with various aspects disclosed herein.
Figure 3B:
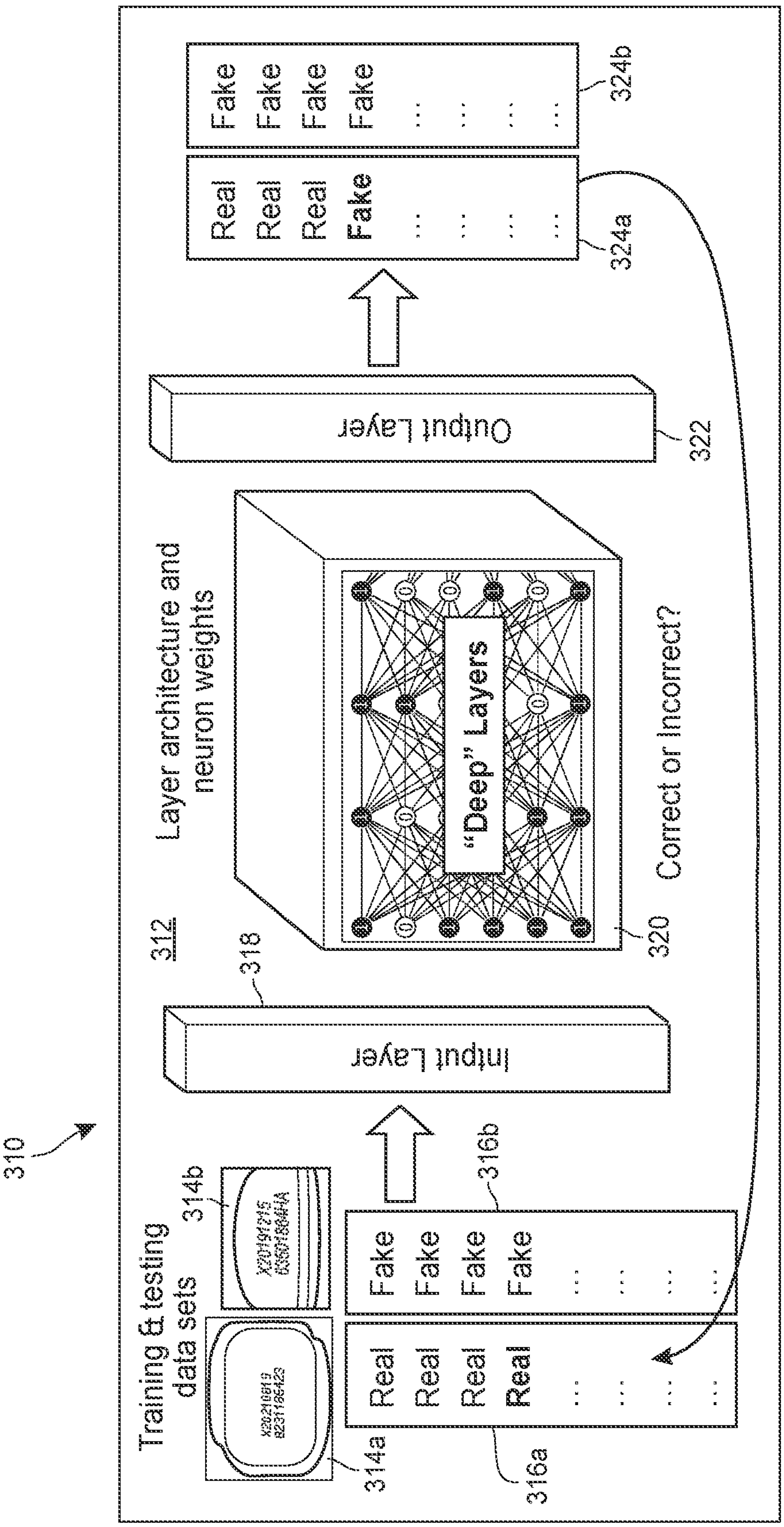
FIG. 3B illustrates an example artificial intelligence (AI) based steganographic method for training a machine learning model to analyze pixel data of a product to detect product counterfeiting, in accordance with various aspects disclosed herein.

FIG. 3A illustrates operation of an exemplary deep learned artificial intelligence (AI) based segmentor model 300 for analyzing pixel data of a product to isolate product codes/batch codes, in accordance with various aspects disclosed herein. The deep learned segmentor may receive as input data one or more product images 302 taken from different angles and in different lighting conditions (e.g., axial product image 302*a* and transverse product image 302*b*) and may be trained to generate one or more output images 304 having background data removed. Each of the product images 302 may be processed into multiple respective outputs, such as background removed images 304*a*, 304*b*, 304*c* and 304*d*. In this way, the segmentor model may be trained to extract label data as part of a pre-processing pipeline. The segmentor model may be stored in the server(s) 102, along with the AI based imaging model 108. The segmentor model may be loaded and used in conjunction with the AI based imaging model 108, wherein for example the output of the segmentor model is fed directly to the AI based imaging model 108. In some aspects, the segmentor model may comprise one or more layers of a hybrid, or ensemble, machine learning model, as depicted in FIG. 3B. Different segmentor models may be trained to extract barcodes, batch codes, etc.

FIG. 3B illustrates an example artificial intelligence (AI) based steganographic method 310 for training a machine learning model 312 to analyze pixel data of a product to detect product counterfeiting, in accordance with various aspects disclosed herein. The method 310 may include preprocessing one or more real (i.e., not counterfeit) and fake (i.e., counterfeit) training and testing data sets (blocks 314*a* and 314*b*). For example, the real and fake data sets may comprise, respectively, many (e.g., thousands or more) images of authentic and inauthentic, i.e., non-counterfeit and counterfeit, products such as the product 222 of FIG. 2B, each including a label such as the label 202 of FIG. 2A. The labels may include steganographic and/or batch codes as discussed herein. The method 310 may include preprocessing the images in the training data sets at blocks 314 to isolate the portions of product images including authentic and inauthentic product codes/batch codes, respectively (block 316*a* and 316*b*). The respective segmented output may be labeled as authentic or inauthentic, in some aspects. The segmentation technique may be operated as discussed with respect to FIG. 3A.

In aspects wherein machine learning is used to identify batch codes in image data and/or to classify batch codes as authentic/inauthentic, the training and testing data sets at blocks 314 may include training the machine learning model 312 by analyzing a plurality of batch code training images depicting authentic batch code features. For example, the training and testing data sets may include images of authentic batch codes and inauthentic batch codes. As discussed below, when a counterfeit is detected, an image of the batch code included on the counterfeit item may be used to further train the machine learning model 312, so that the model is always improving and becoming more accurate and over time, in response to creative forgers.

The method 310 may include feeding labeled segmented authentic and inauthentic product to the input layer of a model having a networked layer architecture (e.g., an artificial neural network, a convolutional neural network, etc.) for training the machine learning model 312 to differentiate between authentic and inauthentic codes (block 318). The method 310 may include propagating the labeled data through one or more connected deep layers of the machine learning model 312 to establish weights of one or more nodes, or neurons, of the respective layers (block 320). Initially, the weights may be initialized to random values, and one or more suitable activation functions may be chosen for the training process at block 320, as will be appreciated by those of ordinary skill in the art. The method 310 may include training an output layer of the machine learning model (block 322). The output layer may be trained to output an indication of whether an input image is a counterfeit item or a non-counterfeit item (block 324*a* and block 324*b*). The machine learning model 312 may correspond to the AI based imaging model 108 of FIG. 1, for example.

Once trained, the machine learning model 312 may be operated in an inference mode, whereupon when provided with de novo image input that the model 312 has not previously been provided, the model 312 may output one or more image classifications corresponding to a pixel-based feature presence or absence of the one or more authentic steganographic features and/or the batch code.

Figure 3C:
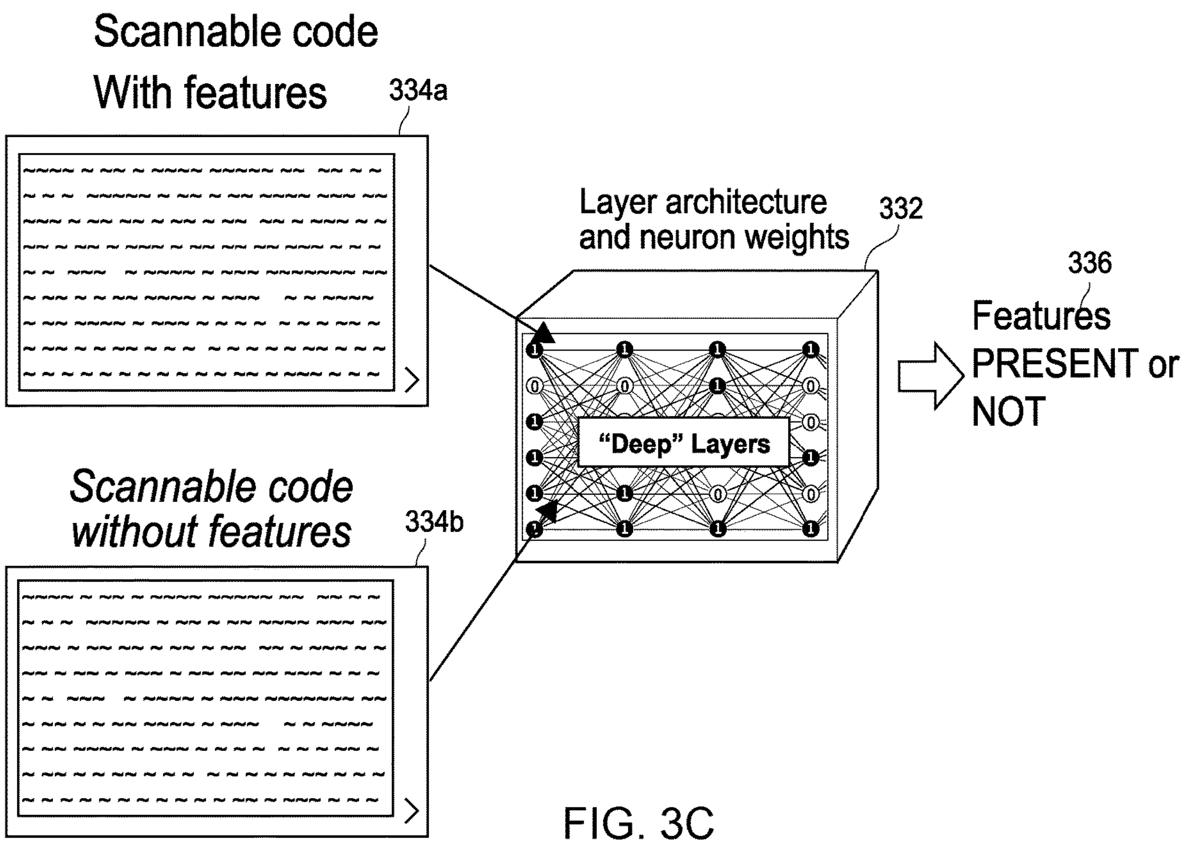
FIG. 3C illustrates exemplary training of an example artificial intelligence (AI) based steganographic model for analyzing pixel data with features and without features to generate an output indicative of whether features are present, in accordance with various aspects disclosed herein.

In various aspects, AI based imaging model (e.g., AI based imaging model 108) is an artificial intelligence (AI) based model trained with at least one AI algorithm. Training of AI based imaging model 108 involves image analysis of the training images to configure weights of AI based imaging model 108, and its underlying algorithm (e.g., machine learning or artificial intelligence algorithm) used to predict and/or classify future images. For example, in various aspects herein, generation of AI based imaging model 108 involves training AI based imaging model 108 with the plurality of training images comprising (1) a first subset of images each depicting at least a portion of a product having one or more authentic steganographic features, and (2) a second subset of images each depicting at least a portion of the product devoid of the one or more authentic steganographic features, as depicted in FIG. 3C. In some aspects, one or more processors of a server or a cloud-based computing platform (e.g., imaging server(s) 102) may receive the plurality of training images via a computer network (e.g., computer network 120). In such aspects, the server and/or the cloud-based computing platform may train the AI based imaging model with the pixel data of the plurality of training images.

In various aspects, a machine learning imaging model, as described herein (e.g. AI based imaging model 108), may be trained using a supervised or unsupervised machine learning program or algorithm. The machine learning program or algorithm may employ a neural network, which may be a convolutional neural network, a deep learning neural network, or a combined learning module or program that learns in two or more features or feature datasets (e.g., pixel data) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be included as a library or package executed on imaging server(s) 102. For example, libraries may include the TENSORFLOW based library, the PYTORCH library, and/or the SCIKIT-LEARN Python library.

Machine learning may involve identifying and recognizing patterns in existing data (such as authentic steganographic features and/or serialized batch codes (or the lack thereof) in the pixel data of image as described herein) in order to facilitate making predictions, classifications, and/or identifications for subsequent data (such as using the model on new pixel data of a new image in order to determine or generate a classification or prediction for, or associated with, detecting whether a product is authentic or counterfeit based on the image classification or prediction).

Machine learning model(s), such as the AI based imaging model described herein for some aspects, may be created and trained based upon example data (e.g., "training data" and related pixel data) inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques.

In various aspects, training AI based imaging model 108 may be an ensemble model comprising multiple models or sub-models, comprising models trained by the same and/or different AI algorithms, as described herein, and that are configured to operate together. For example, in some aspects, each model be trained to identify or predict an image classification for a given image, where each model may output or determine a classification for an image such that a given image may be identified, assigned, determined, or classified with one or more image classifications.

AI based imaging model (e.g., based imaging model 108) is trained to determine whether a product is authentic or counterfeit based on image analysis of images of normal and/or altered images of the product and whether such images have (or do not have) some or all of the steganographic features within the given images. In various aspects, the plurality of training images may comprise (1) a first subset of images each depicting at least a portion of the product having one or more authentic steganographic features, and (2) a second subset of images each depicting at least a portion of the product devoid of the one or more authentic steganographic features. In some aspects, the present techniques may, upon determining that the image is devoid of one or more authentic steganographic features, further analyze the pixel data of an input image to extract one or more batch codes. The extracted batch codes may be added to a counterfeit list based on the detected absence of the steganographic features.

In some aspects, one or more of the plurality of training images may comprise multiple angles or perspectives of the product (e.g., Product 222 as depicted in block diagram 220). Such multiple angles of the product improve the accuracy of AI based imaging model 108 as the computing instructions is trained or otherwise configured to analyze new images, for authenticity or counterfeiting given images, where the new images may have been capture, by digital a camera, a various or multiple angles, perspectives, and/or different vantage points.

Additionally, or alternatively, one or more of the plurality of training images for training AI based imaging model 108 may each comprise a cropped image having a reduced pixel count compared with a respective original image. In such aspects, a cropped image would include steganographic features for training or executing AI based imaging model 108 for detecting authentic or counterfeit products. For example, a cropped feature may comprise a portion of a product having one or more authentic steganographic features or a portion of the product devoid of the one or more authentic steganographic features.

In some aspects, a plurality of training images may comprise a third subset of images, each depicting at least a portion of a given product having one or more real counterfeit features. In such aspects, AI based imaging model may be further trained with the third subset of images. In this, way, AI based imaging model (e.g., AI based imaging model 108) may be updated, enhanced, or improved with additional training data, including additional images and/or features (or lack thereof) in order to improve the accuracy of AI based imaging model 108 to detect or determine whether the product is authentic or counterfeit based on the image classification. For example, the deep learned segmentor of FIG. 3A may be retrained using the third subset of images.

In various aspects, AI based imaging model 108 preferably analyzes or uses a plurality of authentic steganographic features, as potentially detected within an image, to determine whether a given product is authentic or counterfeit based on image classification. For example, AI based imaging model is preferably provided a new image having a plurality of steganographic features (or the lack thereof) and may detect the presence or absence of two or more (e.g., possibly six) features in order to detect or determine whether the product is authentic or counterfeit based on the image classification. In some aspects, the counterfeit product detection app may be configured to add a batch code to the counterfeit list when a majority (e.g., four of the six) features are indicative of a counterfeit. Similarly, in some aspects the machine learning model 312 may be configured to output a probability score representing the likelihood that an input image corresponds to a counterfeit product. The counterfeit product detection app may include instructions for performing additional counterfeit detection steps at different probability thresholds, and/or for only adding the batch code corresponding to the input image to the counterfeit list when the probability exceeds a threshold (e.g., 80% confidence). Generally, the ultimate determination of whether a product is a counterfeit may be represented as either a Boolean or continuous (e.g., probabilistic/multi-variate) output, depending on the implementation.

FIG. 3C illustrates exemplary training of an example artificial intelligence (AI) based steganographic model 332 for analyzing pixel data with synthetic authentic features 334*a* and synthetic inauthentic features 334*b* to generate an output 336 indicative of whether steganographic features are present, in accordance with various aspects disclosed herein. The synthetic features 334 may be generated using a separate machine learning process wherein labeled example data (e.g., barcode artwork) is fed into a generative algorithm, or adversarial algorithm, to generate artwork that is intended to appear real to a human. The machine learning process may include randomly augmenting some of the generated artwork (e.g., the synthetic authentic features 334*a*) with steganographic features, while not augmenting other generated artwork (e.g., the synthetic inauthentic features 334*a*). Once the synthetic features are generated, they may be used to train the steganographic model 332.

Figure 4:
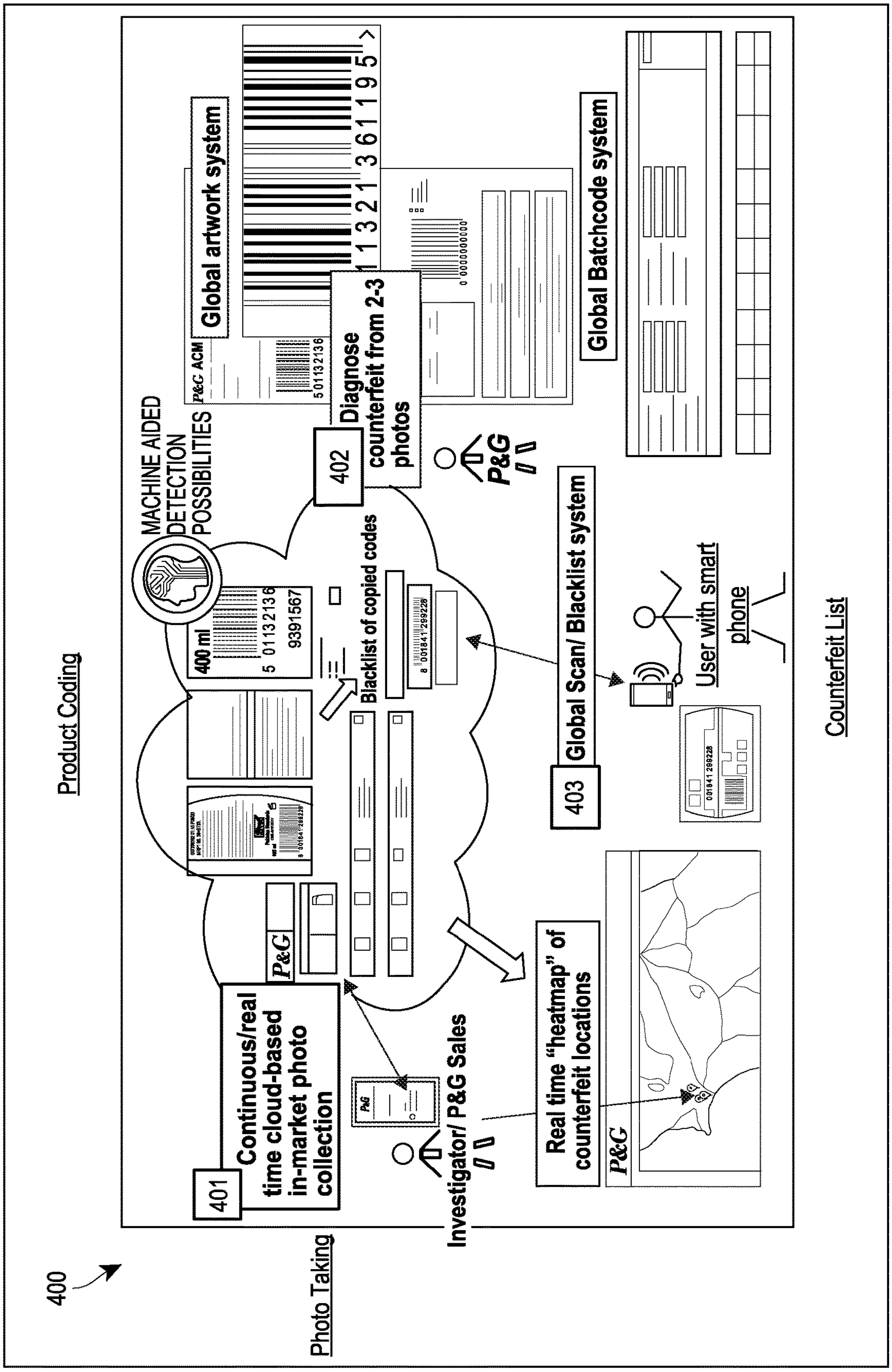
FIG. 4 depicts an exemplary computer-implemented method for performing AI based imaging for counterfeit detection, according to the present disclosure.

FIG. 4 illustrates an exemplary method 400 for performing machine-aided counterfeit and imaging detection, in accordance with the present disclosure. The method 400 includes obtaining a digital image of a physical product of a product line, the digital image captured by an imaging device and the digital image comprising pixel data (block 401). The digital image may be collected from an investigator and/or a sales person. As discussed above, the method 400 may include analyzing the pixel data to detect within the pixel data a batch code uniquely identifying a batch of the physical product of the product line.

The batch code may be extracted using any of several approaches, including optical character recognition (OCR), machine learning, etc. The method 400 may include analyzing the digital image to determine that the batch code is counterfeit. The analysis may be limited to determining that the image lacks authentic steganographic features, as discussed above. The method 400 may also (or alternatively) include comparing the batch code to a counterfeit list to determine whether the batch code appears in the list, and when it does, determining that the batch code is counterfeit. The method 400 may include, when the image lacks authentic steganographic features, and the batch code does not appear in the counterfeit list, augmenting the counterfeit list of batch codes to include the batch code.

In some cases, the method 400 may append the batch code to the counterfeit list without checking whether the code already appears on the list (i.e., a global artwork system). In some aspects, the counterfeit list may be implemented as set, hash table or other data structure that enforces uniqueness of keys (i.e., batch codes). In that case, a try/catch block may be used to implement code that automatically catches a KeyError or other exception (e.g., in the Python programming language) when the batch code already appears in the counterfeit list. The method 400 may include making the counterfeit list of batch codes electronically accessible to the counterfeit product detection app for one or more further counterfeit detection iterations by, for example, storing the counterfeit list in a non-transitory memory (e.g., a memory of the user device 112*c*1, the memory 106, the database 105, etc.).

The method 400 may include diagnosing a counterfeit product from two or more photos (block 402). Specifically, the method 400 may include obtaining a second digital image of a second physical product of the product line, the second digital image captured by an imaging device and the second digital image comprising second pixel data (block 403). The second physical product may be, for example, a second bottle of the same brand of shampoo. The method 400 may include analyzing the second digital image to detect within the second pixel data a second batch code. Detecting the batch code may be performed in a substantially similar way as determining the first batch code (e.g., via OCR, machine learning model, etc.). The method 400 may include determining that the second physical product is counterfeit by referencing the counterfeit product list to detect a redundancy between the batch code and the second batch code. The redundancy may be a configurable match of one or more characters of the batch code and the second batch code. For example, a 100% identity between the batch code and the second batch code (or less) may be required in order for the method 400 to determine a redundancy exists.

One of the more powerful aspects of the present techniques is the ability of the system to automatically learn online, over time and in response to external stimuli. For example, when the redundancy is detected at step 402, the method 400 may include retraining the machine learning model 312 of FIG. 3B with the never-before-seen counterfeit image pixel data. Thus, as forgers and copyists create new counterfeit products, the system is constantly learning from such examples and becoming a more effective judge of fakes and forgeries. This represents critically advantageous improvement over prior art methods that are static or which require manual retraining. A technique in the art known as transfer learning enables this online learning to occur without downtime, and without requiring the machine learning model 312 to be retrained from scratch.

One or both of the first batch code and the second batch code each respectively include at least one of a serialized code, a unique code, and/or a common code. The common code may be shared by (i) at least two respective physical products of the product line, and/or (ii) fewer than twenty respective physical products of the product line. One or both of the first batch code and the second batch code correspond to a stock keeping unit. one or both of the first batch code, and the second batch code each respectively include a production date corresponding to the physical product of the product line, a production plant corresponding to the physical product of the product line, a production line corresponding to the physical product of the product line, a production time corresponding to the physical product of the product line, a counter value corresponding to the physical product of the product line; and/or a randomized value corresponding to the physical product of the product line. For example, a randomized value corresponding to the physical product of the product line could be a set of 2,3,4 counter digits that count up to 99,999,9999 respectively. In this example, given a time stamp HH:MM, if there are 400 items per minute made and printed, then a 3 digit counter will ensure unique per item codes.

As discussed above, the method 400 may include incrementing a respective counter corresponding to the redundancy. In this way, each time a counterfeit item is detected, the counter may be increased by one. The method 400 may determine, based on the counter exceeding a pre-determined threshold, that the second physical product is counterfeit. For example, the sensitivity of the overall counterfeit and imaging detection system may be configured, to allow for a number of counterfeit items (e.g., 100 or fewer) to exist before the method 400 begins to increment the respective counter.

The method 400 may include generating a real-time heat map of counterfeit locations. The method 400 may include cross-referencing the respective counter for a given product (e.g., a shampoo) with at least one of geographic information or temporal information corresponding to one or both of the first physical product and the second physical product. For example, a map may be displayed that depicts a visual indication whose size or color is proportional to the respective count of counterfeit products detected at that location. The heat map may enable the user to select one or more products to display. In this way, the present techniques advantageously improve conventional counterfeit detection techniques by enabling users to visualize the magnitude of counterfeit products in a given location. Merely by analyzing raw data, a user may not be able to quickly determine (if at all) that there is a significant counterfeiting issue in a geographic region.

In some aspects, the present techniques may selectively disable reporting from certain areas in response to the heat map. For example, when counterfeiting becomes a problem in one region, the method 400 may accept only crowd-sourced reports from smart phone users in that location, while discarding others. In so doing, the present techniques are able to more effectively use computing resources, by dynamically discarding large quantities data (and not analyzing that data), when that data is known to be likely be of little probative value in anti-counterfeiting methods and systems.

In still further aspects, the method 400 may include determining, by comparing spatial information included in the geographic information of the first physical product to spatial information included in the geographic information of the second physical product, that the second physical product is counterfeit. For example, if geolocation data or other proximity data of a first IP addresses 232*d* and a second IP address 232*d* of FIG. 2B indicate, respectively, that a shampoo bottle having the same batch code are located in San Diego, California and Beijing China and, the method 400 may determine that the bottle of shampoo corresponding to the second bottle of shampoo is a counterfeit. It will be appreciated that this improves the baseline counterfeit determination of a matching batch code by providing a further geographic-based check, only strengthening the determination that the second bottle represents a counterfeit. Of course, the method 400 may base spatial determinations on much more granular information, such as the distance between the first and second product exceeding a smaller threshold distance (e.g., 10 miles or less).

In yet further aspects, the method 400 may determine, based on an interval between a time included in the temporal information of the first physical product, and a time included in the temporal information of the second physical product, that the second physical product is counterfeit. For example, if a second bottle of shampoo having the same batch code is scanned by a crowdsource user before the container shipment containing the first bottle reaches a port of call, or is otherwise tied up in a supply chain, the method 400 may conclude that the second bottle is a counterfeit.

As discussed herein, the method 400 may include analyzing the digital image to detect within the pixel data a batch code uniquely identifying a batch of the physical product of the product line. In some aspects, the batch code may be printed entirely or fully upon a copy-evident background. The method 400 may include analyzing the pixel data of the digital image to detect changes in the copy-evidence background introduced by copying. In some aspects of the invention, artwork of the authentic products may include copy-evident background material upon which the batch code is printed by a batch code printer. A benefit of these aspects is providing a further deterrent to counterfeiters and another source of counterfeit detection. The copy-evident background, in some examples, may include one or more void pantograph patterns as used in the printing of physical financial documents (e.g., checks). The void pantograph may include patterns designed to exploit the limitations in resolution of copiers and scanners. For example, a void pantograph pattern (e.g., a big-dot-little-dot pattern) may include small dots that are below the resolution threshold of a mimeograph/copy machine, resulting in the dots becoming lighter when copied.

By using one or more void pantograph technique, the method 400 may advantageously increase the contrast between the small dots and the large dots and the "void" message in the original document becomes obvious in the copy. A variety of other void pantograph approaches exist and are continually being improved as copier and scanner technology advances are made. Alternatively, various copy-evident patterns can be applied, such as those disclosed in U.S. Pat. Nos. 8,893,974B; 10,710,393B2; and WO2020/245290A1. For example, guilloche patterns, in some aspects, the method 400 may include analyzing the image to detect geometric repeating patterns. In still further aspects, the copy-evident background may be automatically generated by an software plug-in (e.g., an Adobe software plugin, Fortuna™ by Agfa NV; Secure Design Software by JURA™, ONE by KBA™ and Arziro™ Design by Agfa NV, etc.). Optionally the specific copy-evident background may be based on the numeric value represented by a code associated with the product (e.g., an artwork code, a barcode, or an internal code, etc.).

In yet further aspects, the method 400 may analyzing color as a copy-evident feature. For example, the method 400 may include analyzing packaging ink ink that changes color with special stimuli, such as thermochromic (i.e., heat-sensitive ink) ink, or uv-fluorescent inks (e.g., UV light-sensitive ink). These stimuli affect the color of the copy-evident feature and may be applied when an image of the copy-evident feature is captured (e.g., when the image is captured with a mobile phone camera or via other digital means). Generally, the method 400 may include physically printing product packaging to include copy-evident features as discussed here (e.g., using void pantographs, color, or other approaches) and/or the method 400 may include analyzing such physically printed packaging using the techniques described here (e.g., via one or more machine learning models specifically trained to analyze images comprising pixel data that comprises such copy-evident features).

As discussed, in some aspects, the batch code includes a timestamp. In an aspect, the batch code consists of a timestamp. For example, the method 400 may include stamping, printing, embossing or otherwise marking a product with a batch code consisting of a timestamp (e.g., a UNIX epoch date) having microsecond precision. As long as products manufacturing occurs a super-microsecond pace, each batch code is guaranteed to be a unique identifier.

As an alternative (or complement) to determining the batch code using OCR or a machine learning model, the method 400 may include detecting the first batch code uniquely identifying the batch of the physical product by analyzing a scannable code corresponding to the digital image. For example, the scannable code may be a UPC code, a data matrix code, or another scannable code. The scannable code may be scanned using a software instructions stored in the memory of the device **112*c*1 or in the memory 106**.

In some aspects, the method 400 may include retrieving information corresponding to the batch code, the information including at least one of a known brand, a known flavor, a known size, or a known stock keeping unit as a first further anti-counterfeiting check; and comparing the retrieved information to artwork in the first pixel data as a second further anti-counterfeiting check. For example, the method 400 may determine the scan of the batch code (e.g., the batch code **232*a* of FIG. 2B) indicates that a category (e.g., Hair) and a brand (e.g., Head and Shoulders). The method 400 may invoke a separate brand identification trained machine learning model, for example, that is trained to analyze the artwork of items to determine a category and brand based on visual appearance. The trained brand identification machine learning model may indicate that the category is Baby and the brand is Luvs diapers. In the case of such as mismatch, the method 400** may determine that the item is a counterfeit as an additional check. This represents an improvement over conventional methods that only compare barcodes, without regard to physical appearance, thereby improving the accuracy and intelligence of counterfeit detection methods and systems.

The method 400 may include accessing a serialized code extraction learning model electronically accessible by the counterfeit product detection app, wherein the code extraction learning model is trained with a plurality of batch codes having different steganographic features, and wherein the code extraction learning mode is configured to detect unique batch codes within pixel data of a digital image. Specifically, the serialized code extraction learning model may include one or more machine learning models, OCR models, etc. that are trained using example images (e.g., images of the alphabet, fonts, etc. used to generate the batch codes) and/or images of product labels including the batch codes, whether real or synthetically generated. The serialized code extraction learning model may be trained by analyzing a plurality of batch code training images depicting authentic batch code features.

In some aspects, the steganographic imaging model may be trained using authentic steganographic features that include an indication of a one or more label characteristics of physical products of the one or more product lines, such as (i) an inkjet printing characteristic, and (ii) a laser printing characteristic. In that case, the method 400 may include analyzing the first pixel data of the first physical product using the steganographic model to determine that the first physical product is counterfeit by determining whether the first pixel data corresponds to the inkjet printing characteristic or the laser printing characteristic. Specifically, the type of printing may give away the counterfeit nature of a product.

In some aspects, the method 400 may include extracting metadata from the first digital image, the metadata including at least one of a scan datetime a scan location, and a scan device identifier. The scan device identifier may include at least one internet protocol address of the scan device, as shown in FIG. 2B. As discussed above, the method 400 may include detecting, based on the metadata, one or more geographical patterns and generating one or more visualizations based on the metadata (e.g., a heat map). The method 400 may include, based on the metadata, geolocating the scan device by analyzing an internet protocol address of the scan device, and comparing the geolocation of multiple scans. The method 400 may include crowdsourcing at least the second digital image, and potentially many more (e.g., thousands).

The pixel data of each image may be analyzed using the serialized code extraction model. When the batch code output by the serialized code extraction model is on the counterfeit list, the method 400 may cease, having determined that the product is a counterfeit. When the batch code output by the serialized code extraction model is not on the counterfeit list, the method 400 may analyze the pixel data of the image using the steganographic model. When the authentic steganographic model features are detected, the method 400 may complete. When the authentic steganographic model features are not detected, the batch code may be added to the counterfeit list. In this way, the method 400 advantageously avoids performing CPU-intensive steganographic modeling when the batch code is already known to be counterfeit, thereby advantageously conserving computational resources and improving counterfeit and imaging detection technology.

In some aspects, the method 400 may include extracting a stock keeping unit from the first digital image; and comparing the stock keeping unit to the second batch code. Those of ordinary skill in the art will appreciate that printed symbol steganographic features may take many forms in accordance with various aspects herein. For example, printed symbols may be printed on a product, e.g., a bottom substrate of a shampoo bottle. Printed symbols may comprise extra printed symbols or unique patterns, in which a specific arrangement, number of dots, positioning, sizing, and/or other attributes of the printed symbol indicate authenticity (or the lack thereof, if such patterns are different from an expected or predefined printed symbol) of the given product. The printed symbols may be printed using a printer (e.g., printer 130), such as online printer, continuous inkjet, laser printer, thermal transfer printer, embossed printer, etc. More generally, printed symbols may comprise punctuation, such as a period, dot, hyphen, or explanation point, etc.

Steganographic features may be represented as alphanumeric, textual characters, and/or fonts based steganographic features that may be printed on a product and/or substrate of a product. These features may take on the form of normal (i.e., non-altered) sets of alphanumeric values, textual characters, and fonts, or altered sets of alphanumeric values, textual characters, and fonts comprising steganographic features, which may correspond to authentic steganographic features as described herein. For example, steganographic features may include alterations to fonts for selected characters that may be selected from, for example, true-type fonts, bespoke fonts; different size(d) characters; different character widths; font lookalikes (e.g., Unicode encodings); wingdings, different colour(s) for selected characters; displacement/orientation for selected characters; additional seemingly random elements; bolding of some characters; additional or less whitespace; etc. Similarly, the steganographic features may include graphical alteration features printed or otherwise affixed on a product and/or substrate of a product, such as a normal (non-altered) graphic logo, an alternate graphic logo having an altered steganographic (e.g., a slightly enlarged/smeared graphical border, barcode, or other artistic/functional element).

In some aspects, steganographic features may be synthetic images generated by deleting or annotating at least a portion of an image or its features, or by adversarial generation, as discussed with respect to FIG. 3C. Generally, synthetic inauthentic images comprise an image, artwork, or printed code without known authentic features. In various aspects, AI based imaging model 108 is trained to recognize whether steganographic features are there or not, based on the presence or absence of such features as determined by image pixel data. In this way, two training sets of synthetic data are generated for training AI based imaging model 108 where one set has the features in the artwork (or other printed codes), and the other set has no features. AI based imaging model 108 may be trained using synthetic and/or real life example data, to recognize if features are present or not, thus allowing for counterfeit classification based on imaging as described herein. An advantage of applying synthetic training data is that this obviates the need to collect large volumes of example images for training a priori. However, in crowd sourcing aspects, this advantage may be of less importance.

The present techniques contemplate physical steganographic package alteration of products and/or substrates of a product, such a raised bump or indentation, additions(s) of seemingly random or extra texture/elements on the product or substrate of the product; alteration(s) of indented or textured symbols on the product or substrate of the product; alteration(s) of shapes of cuts in to the product or substrate of the product; and/or alteration(s) of embossing to the product or substrate of the product. Such packaging alternations may be made to, e.g., plastic, cardboard, or other physical portions of the product and/or its packaging.

More generally, such product alterations, or other modifications as described herein, comprise a visual or pixel difference, within the respective images, the differences depicting an image of a normal product and an image of altered illustrating pixel-based feature presence or absence of the one or more authentic steganographic features. Such pixel differences may be used to train AI based imaging model 108 as described herein. In addition, such pixel differences are also used to classify images, using AI based imaging model 108 to detect whether a product is authentic or counterfeit based on image classification as described herein. Such determinations may be skipped in the case when a known counterfeit product code is found upon initial analysis (e.g., via OCR or machine learning analysis).

Batch codes may include, without limitation, a QR code, a data matrix code, and/or otherwise scannable codes. Steganographic features may be printed as part of the data matrix code and/or QR code, such as part of the alphanumeric code or other information of these scannable, 2D codes. Additionally, or alternatively, a data matrix code or QR code may be printed in a proximity to, such as alongside, an alphanumeric code on the product (e.g., a batch code). That is, in some aspects, a data matrix code or QR code may be printed alongside an alphanumeric code of the product (wherein the alphanumeric code may include a batch code, date, time etc., so the each of the alphanumeric codes are serialized). In other aspects, the data matrix code or QR code could contain the alphanumeric code. In such aspects, the steganographic feature may be found within the printed alphanumeric code. Such data matrix codes and/or QR codes could provide the advantage of allowing a scanner or printer to better align the image to read the alphanumeric code (including any steganographic features embedded therein (e.g., font style, off set printed etc.) in conjunction with the positioning of the data matrix code and/or QR code. In addition, the positioning such data matrix codes and/or QR codes, relative to other features or portions of a product, may provide an authenticating feature(s) in and of themselves.

In a specific aspect, a two dimensional (2D) data matrix or a QR code may be depicted in a proximity of one or more of the authentic steganographic features of a product. Computing instructions of the counterfeit product detection app, when executed by the one or more processors, may be configured to cause the one or more processors to detect whether a product is authentic or counterfeit by analyzing an alignment or position of the 2D data matrix or QR code, respectively, with respect to the one or more of the authentic steganographic features. Such alignment or position may then be used to determine or classify, e.g., by AI based imaging model 108 whether product is authentic or counterfeit.

In an aspect, a barcode may include steganographic features in accordance with various aspects herein. For example, the barcode may include differences in one or more portions, as may be printed on a product and/or substrate of a product. For example, a barcode may be a normal (i.e., non-altered) bar code or an altered, modified, or reference bar code. Those of ordinary skill in the art will appreciate that many other alternations to barcodes (or other features) are contemplated herein that allows the barcode to remain functional (e.g., scannable) but also allows for the modification or otherwise inclusion of steganographic features.

Those of ordinary skill in the art will also appreciate that other aspects for generating authentic steganographic feature(s), in addition to, or different from, those of the examples depicted herein are contemplated. Such images comprise or include visual differences included or generated for steganographic purposes and related image classification of the pixels of those images for counterfeit detection purposes as described herein.

More generally, visual or pixel difference(s) between the images may be generated by modifying or deleting features of a set of base images. For example, in some aspects, visual or pixel difference(s) between the images may be generated where a base set of images, e.g., a first subset of images, each depicting at least a portion of the product having one or more authentic steganographic features, are altered, such as by modifying or deleting features, such that the base set of images become, or cause to be generated, a new set of images, e.g., a second subset of images, each depicting at least a portion of the product devoid of the one or more authentic steganographic features. Such images and features may be used to train AI based imaging model 108.

Additionally, or alternately, visual or pixel difference(s) between the images may be generated through one or more iterations of a generative adversarial network (GAN), where a base set of images each depicting at least a portion of the product having one or more authentic steganographic features, are altered, such as by modifying or deleting features over multiple iterations of a GAN, such that the base set of images become, or cause to be generated, a new set of images, e.g., a second subset of images, each depicting at least a portion of the product devoid of the one or more authentic steganographic features. Such images and features may be used to train AI based imaging model 108.

It will be further understood that one of the striking properties of digital steganographic encoding is that the differences between images with and without steganographic features are typically imperceptible to the human eye. Thus, in aspects of the present techniques, steganographic features are added to barcodes, artworks, labels etc. of physical goods in a way that is not visually apparent to humans, but is readily detectible to a machine. Thus, the steganographic images are transformed from one state to another.

ASPECTS OF THE DISCLOSURE

The following aspects are provided as examples in accordance with the disclosure herein and are not intended to limit the scope of the disclosure.

1. A counterfeit and imaging detection system, the counterfeit and imaging detection system comprising: one or more processors; a counterfeit product detection application (app) including computing instructions configured to be executed by the one or more processors; and a steganographic imaging model, electronically accessible by the counterfeit product detection app, and trained using a first set of training images depicting one or more authentic steganographic features, and a second set of training images depicting a lack of the one or more authentic steganographic features, wherein the steganographic imaging model is configured to analyze input pixel data of respective input digital images, each input digital image depicting a presence or a lack of one or more steganographic features, and to output respective indications of whether the respective input digital images are authentic or counterfeit, and wherein the computing instructions of the counterfeit product detection app, when executed by the one or more processors, are configured to cause the one or more processors to: obtain a digital image of a physical product of a product line, the digital image captured by an imaging device and the digital image comprising pixel data, analyze the digital image to detect within the pixel data a batch code uniquely identifying a batch of the physical product of the product line, analyze the pixel data of the digital image to determine that the batch code is counterfeit, and augment a counterfeit list of batch codes to include the batch code, wherein the counterfeit list of batch codes remains electronically accessible to the counterfeit product detection app for one or more further counterfeit detection iterations.
2. The system of aspect 1, wherein the computing instructions of the counterfeit product detection application, when executed by the one or more processors in a further iteration, are further configured to cause the one or more processors to: obtain a second digital image of a second physical product of the product line, the second digital image captured by an imaging device and the second digital image comprising second pixel data; analyze the second digital image to detect within the second pixel data a second batch code; and determine that the second physical product is counterfeit by referencing the counterfeit list to detect a redundancy between the batch code and the second batch code.
3. The system as in any one of aspects 1-2, wherein the computing instructions of the counterfeit product detection application, when executed by the one or more processors in a further iteration, are further configured to cause the one or more processors to: retrain, in response to determining that the second physical product is counterfeit, the steganographic imaging model using the second digital image captured by the imaging device as retraining input to the steganographic imaging model.
4. The system of aspect 2, wherein one or both of the batch code and the second batch code each respectively include at least one of a serialized code, a unique code, or a common code.
5. The system as in any one of aspects 1-4, wherein the common code is shared by (i) at least two respective physical products of the product line, and (ii) fewer than twenty respective physical products of the product line.
6. The system of aspect 2, wherein one or both of the batch code and the second batch code correspond to a stock keeping unit.
7. The system of aspect 2, wherein one or both of the batch code, and the second batch code each respectively include a production date corresponding to the physical product of the product line, a production plant corresponding to the physical product of the product line, a production line corresponding to the physical product of the product line, a production time corresponding to the physical product of the product line; or a randomized value corresponding to the physical product of the product line.

8. The system of aspect 2, wherein the computing instructions of the application, when executed by the one or more processors in a further iteration, are further configured to cause the one or more processors to: increment a respective counter corresponding to the redundancy.

9. The system as in any one of aspects 1-8, wherein the computing instructions of the application, when executed by the one or more processors in a further iteration, are further configured to cause the one or more processors to: determine, based on the counter exceeding a pre-determined threshold, that the second physical product is counterfeit.

10. The system as in any one of aspects 1-8, wherein the computing instructions of the application, when executed by the one or more processors in a further iteration, are further configured to cause the one or more processors to: generate cross-referenced information by comparing the respective counter with at least one of geographic information, or temporal information corresponding to one or both of the first physical product and the second physical product.

11. The system as in any one of aspects 1-10, wherein the computing instructions of the application, when executed by the one or more processors in a further iteration, are further configured to cause the one or more processors to: generate a map graphical user interface depicting the cross-referenced information.

12. The system as in any one of aspects 1-10, wherein the computing instructions of the application, when executed by the one or more processors in a further iteration, are further configured to cause the one or more processors to: determine, by comparing spatial information included in the geographic information of the first physical product to spatial information included in the geographic information of the second physical product, that the second physical product is counterfeit.

13. The system as in any one of aspects 1-12, wherein the comparing includes computing a distance between the location of the first physical product and the location of the second physical product.

14. The system as in any one of aspects 1-10, wherein the computing instructions of the application, when executed by the one or more processors in a further iteration, are further configured to cause the one or more processors to: determine, based on an interval between a time included in the temporal information of the first physical product, and a time included in the temporal information of the second physical product, that the second physical product is counterfeit.

15. The system of claim 1, wherein the batch code is at least partially printed upon a copy-evident background; and wherein the computing instructions of the application, when executed by the one or more processors in a further iteration, are further configured to cause the one or more processors to: analyze the pixel data of the digital image to detect changes in the copy-evidence background introduced by copying.

16. The system of aspect 1, wherein the batch code one or both of (i) includes a timestamp, and (ii) consists of a microsecond-precision timestamp.

17. The system of aspect 1, wherein the computing instructions of the application, when executed by the one or more processors, are further configured to cause the one or more processors to: detect the batch code uniquely identifying the batch of the physical product by analyzing a scannable code corresponding to the digital image.

18. The system as in any one of aspects 1-17, wherein the computing instructions of the application, when executed by the one or more processors, are further configured to cause the one or more processors to: retrieve information corresponding to the batch code, the information including at least one of a known brand, a known flavor, a known size, or a known stock keeping unit as a first further anti-counterfeiting check; and compare the retrieved information to artwork in the pixel data as a second further anti-counterfeiting check.

19. The system as in any one of aspects 1-18, wherein the computing instructions of the application, when executed by the one or more processors, are further configured to cause the one or more processors to: detect the batch code using one or more of optical character recognition and machine learning techniques.

20. The system as in any one of aspects 1-17, wherein the counterfeit and imaging detection further comprises a camera device configured to analyze scannable codes; and wherein the computing instructions of the application, when executed by the one or more processors, are further configured to cause the one or more processors to: detect the batch code using the camera device to analyze the scannable code.

21. The system of aspect 1, further comprising a serialized code extraction learning model electronically accessible by the counterfeit product detection app, wherein the code extraction learning model is trained with a plurality of batch codes having different steganographic features, and wherein the code extraction learning mode is configured to detect unique batch codes within pixel data of a digital image.

22. The computing system as in any one of aspects 1-21, wherein the code extraction learning model is a machine learning model; and wherein the computing instructions of the application, when executed by the one or more processors, are further configured to cause the one or more processors to: train the machine learning model by analyzing a plurality of batch code training images depicting authentic batch code features.

23. The system of aspect 1, wherein the one or more authentic steganographic features include an indication of a one or more label characteristics of physical products of the product line.

24. The system of as in any one of aspects 1-23, wherein the indication of the label characteristics includes one or both of (i) an inkjet printing characteristic, and (ii) a laser printing characteristic; and wherein the computing instructions of the application, when executed by the one or more processors, are further configured to cause the one or more processors to: analyze the first pixel data of the first physical product using the steganographic imaging model to determine that the first physical product is counterfeit by determining whether the first pixel data corresponds to the inkjet printing characteristic or the laser printing characteristic.

25. The system of aspect 1, wherein the computing instructions of the application, when executed by the one or more processors, are further configured to cause the one or more processors to: extract metadata from the first digital image, the metadata including at least one of a scan datetime, a scan location, and a scan device identifier.
26. The system as in any one of aspects 1-25, wherein the scan device identifier includes at least one internet protocol address of the scan device.
27. The system as in any one of aspects 1-25, wherein the computing instructions of the application, when executed by the one or more processors, are further configured to cause the one or more processors to: generate, based on the metadata, a heat map.
28. The system as in any one of aspects 1-25, wherein the computing instructions of the application, when executed by the one or more processors, are further configured to cause the one or more processors to: detect, based on the metadata, one or more geographical patterns.
29. The system of aspect 1, wherein the computing instructions of the application, when executed by the one or more processors, are further configured to cause the one or more processors to: geolocate the scan device by analyzing an internet protocol address of the scan device.
30. The system of aspect 2, wherein the one or more further counterfeit detection iterations include crowd-sourcing at least the second digital image.
31. The system of aspect 2, wherein the computing instructions of the application, when executed by the one or more processors, are further configured to cause the one or more processors to: extract a stock keeping unit from the first digital image; and compare the stock keeping unit to the second batch code.

ADDITIONAL CONSIDERATIONS

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm.”

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A counterfeit and imaging detection system, the counterfeit and imaging detection system comprising:

one or more processors;

a counterfeit product detection application (app) including computing instructions configured to be executed by the one or more processors; and a steganographic imaging model, electronically accessible by the counterfeit product detection app, and trained using a first set of training images depicting one or more authentic steganographic features, and a second set of training images depicting a lack of the one or more authentic steganographic features, wherein the steganographic imaging model is configured to analyze input pixel data of respective input digital images, each input digital image depicting a presence or a lack of one or more steganographic features, and to output respective indications of whether the respective input digital images are authentic or counterfeit, and wherein the computing instructions of the counterfeit product detection app, when executed by the one or more processors, are configured to cause the one or more processors to:

obtain a digital image of a physical product of a product line, the digital image captured by an imaging device and the digital image comprising pixel data, analyze the digital image to detect within the pixel data a batch code uniquely identifying a batch of the physical product of the product line, analyze the pixel data of the digital image to determine that the batch code is counterfeit, and augment a counterfeit list of batch codes to include the batch code, wherein the counterfeit list of batch codes remains electronically accessible to the counterfeit product detection app for one or more further counterfeit detection iterations;

wherein the one or more further counterfeit detection iterations comprises:

obtain a second digital image of a second physical product of a product line, the second digital image captured by an imaging device and the second digital image comprising second pixel data, analyzing the second pixel data of the second physical product using a serialized code extraction model to detect a second batch code, determining the second physical product is counterfeit by:

(i) referencing the counterfeit list to detect whether a redundancy exists between the batch codes and the second batch code, (ii) determining that the second batch code does not appear in the counterfeit list of batch codes, and (iii) determining, using the steganographic imaging model, that the second digital image of the second physical product lacks authentic steganographic features, augmenting the counterfeit list to include the second batch code.

2. The system of claim 1, wherein the computing instructions of the counterfeit product detection application, when executed by the one or more processors in a further iteration, are further configured to cause the one or more processors to:

retrain, in response to determining that the second physical product is counterfeit, the steganographic imaging model using the second digital image captured by the imaging device as retraining input to the steganographic imaging model.

3. The system of claim 1, wherein one or both of the batch code and the second batch code each respectively include at least one of a serialized code, a unique code, or a common code.

4. The system of claim 3, wherein the common code is shared by (i) at least two respective physical products of the product line, and (ii) fewer than twenty respective physical products of the product line.

5. The system of claim 1, wherein one or both of the batch code and the second batch code correspond to a stock keeping unit.

6. The system of claim 1, wherein one or both of the batch code, and the second batch code each respectively include a production date corresponding to the physical product of the product line, a production plant corresponding to the physical product of the product line, a production line corresponding to the physical product of the product line, a production time corresponding to the physical product of the product line; or a randomized value corresponding to the physical product of the product line.

7. The system of claim 1, wherein the computing instructions of the application, when executed by the one or more processors in a further iteration, are further configured to cause the one or more processors to:

increment a respective counter corresponding to the redundancy.

8. The system of claim 7, wherein the computing instructions of the application, when executed by the one or more processors in a further iteration, are further configured to cause the one or more processors to:

determine, based on the counter exceeding a pre-determined threshold, that the second physical product is counterfeit.

9. The system of claim 7, wherein the computing instructions of the application, when executed by the one or more processors in a further iteration, are further configured to cause the one or more processors to:

generate cross-referenced information by comparing the respective counter with at least one of geographic information, or temporal information corresponding to one or both of the physical product and the second physical product.

10. The system of claim 9, wherein the computing instructions of the application, when executed by the one or more processors in a further iteration, are further configured to cause the one or more processors to:

generate a map graphical user interface depicting the cross-referenced information.

11. The system of claim 9, wherein the computing instructions of the application, when executed by the one or more processors in a further iteration, are further configured to cause the one or more processors to:

determine, by comparing spatial information included in the geographic information of the physical product to spatial information included in the geographic information of the second physical product, that the second physical product is counterfeit.

12. The system of claim 11, wherein the comparing includes computing a distance between a location of the physical product and a location of the second physical product.

13. The system of claim 9, wherein the computing instructions of the application, when executed by the one or more processors in a further iteration, are further configured to cause the one or more processors to:

determine, based on an interval between a time included in the temporal information of the physical product, and a time included in the temporal information of the second physical product, that the second physical product is counterfeit.

14. The system of claim 1, wherein the batch code is at least partially printed upon a copy-evident background; and wherein the computing instructions of the application, when executed by the one or more processors in a further iteration, are further configured to cause the one or more processors to:

analyze the pixel data of the digital image to detect changes in the copy-evidence background introduced by copying.

15. The system of claim 1, wherein the batch code one or both of (i) includes a timestamp, and (ii) consists of a microsecond-precision timestamp.

16. The system of claim 1, wherein the computing instructions of the application, when executed by the one or more processors, are further configured to cause the one or more processors to:

detect the batch code uniquely identifying the batch of the physical product by analyzing a scannable code corresponding to the digital image.

17. The system of claim 16, wherein the computing instructions of the application, when executed by the one or more processors, are further configured to cause the one or more processors to:

retrieve information corresponding to the batch code, the information including at least one of a known brand, a known flavor, a known size, or a known stock keeping unit as a first further anti-counterfeiting check; and compare the retrieved information to artwork in the pixel data as a second further anti-counterfeiting check.

18. The system of claim 16, wherein the computing instructions of the application, when executed by the one or more processors, are further configured to cause the one or more processors to:

detect the batch code using one or more of optical character recognition and machine learning techniques.

19. The system of claim 16, wherein the counterfeit and imaging detection further comprises a camera device configured to analyze scannable codes; and wherein the computing instructions of the application, when executed by the one or more processors, are further configured to cause the one or more processors to:

detect the batch code using the camera device to analyze the scannable code.

* * * * *